United States Patent
Shinohara

(10) Patent No.: US 7,738,031 B2
(45) Date of Patent: Jun. 15, 2010

(54) IMAGE INPUT DEVICE

(75) Inventor: Junichi Shinohara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 275 days.

(21) Appl. No.: 11/878,242

(22) Filed: Jul. 23, 2007

(65) Prior Publication Data

US 2008/0024654 A1    Jan. 31, 2008

(30) Foreign Application Priority Data

Jul. 25, 2006    (JP)    ............... 2006-202640

(51) Int. Cl.
*H04N 5/238* (2006.01)
*H04N 5/235* (2006.01)
*H04N 5/225* (2006.01)
*G03B 7/00* (2006.01)

(52) U.S. Cl. .................. 348/364; 348/362; 348/360

(58) Field of Classification Search .................. None
See application file for complete search history.

(56) References Cited

U.S. PATENT DOCUMENTS

| 6,720,995 | B1 * | 4/2004 | Kaneda et al. | ........... 348/208.8 |
| 7,450,170 | B2 | 11/2008 | Terai et al. | |
| 2004/0239796 | A1 * | 12/2004 | Imai | ............. 348/362 |
| 2005/0012846 | A1 | 1/2005 | Shinohara | |
| 2005/0068638 | A1 | 3/2005 | Nuno et al. | |
| 2006/0209192 | A1 | 9/2006 | Shinohara et al. | |
| 2007/0086772 | A1 | 4/2007 | Shinohara | |

FOREIGN PATENT DOCUMENTS

| CN | 1577034 A | 2/2005 |
| JP | 10-269325 | 10/1998 |
| JP | 2587789 | 10/1998 |
| JP | 2001-128042 | 5/2001 |
| JP | 2001-223952 | 8/2001 |
| JP | 2002-218328 | 8/2002 |
| JP | 3348800 | 9/2002 |
| JP | 2003-134393 | 5/2003 |
| JP | 2004-80460 | 3/2004 |
| JP | 2005-234143 | 9/2005 |
| JP | 2006-119546 | 5/2006 |
| JP | 2006-259344 | 9/2006 |
| JP | 2007-114283 | 5/2007 |

* cited by examiner

*Primary Examiner*—Sinh Tran
*Assistant Examiner*—Jason A Flohre
(74) *Attorney, Agent, or Firm*—Dickstein Shapiro LLP

(57) ABSTRACT

In an image input device including a multistage aperture (13) which reduces a quantity of light by changing an aperture, and an ND filter (15) which reduces a quantity of light by changing transmittance of passing light, if ghosts tend to occur due to the second light reducing means, the generation of ghosts is effectively avoided. An object determining unit determines whether a strong light source is present on an object image formed by an optical unit (10) for imaging based on luminance distribution on the object image. The multistage aperture (13) and the ND filter (15) are controlled in order to obtain a proper exposure to pickup the object image. If the object determining unit determines which a strong light source is present on the object image, the ND filter (15), which reduces the quantity of light by changing the transmittance of passing light, is used as less as possible, and the multistage aperture (13) is functioned preferentially.

3 Claims, 14 Drawing Sheets

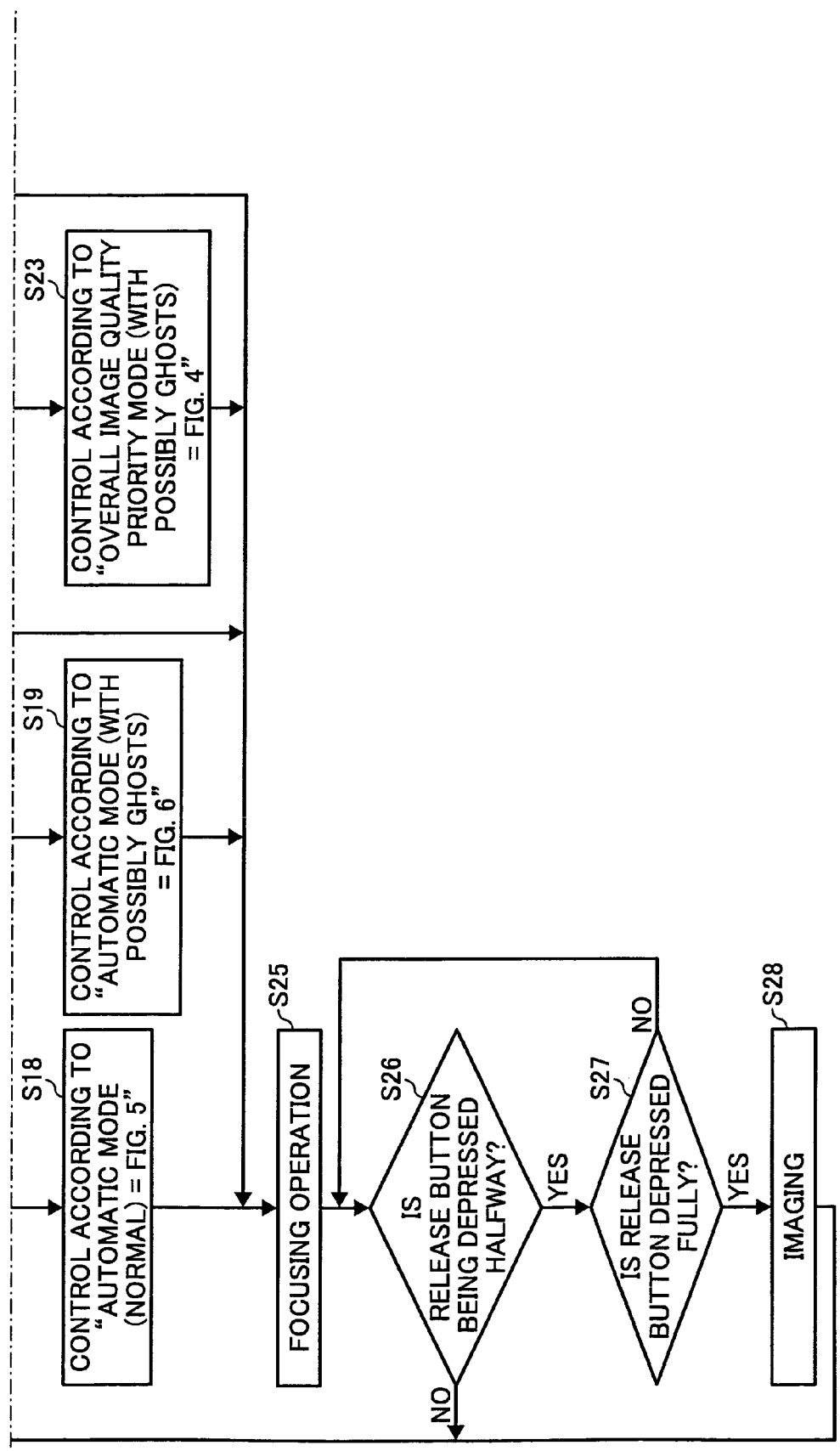

FIG. 9

EXAMPLE OF SIMULTANEOUS USE OF MULTISTAGE APERTURE AND ND FILTER (MULTISTAGE APERTURE IN 1/3-AV INCREMENT)

| WITHOUT INSERTED ND FILTER | | | WITH INSERTED ND FILTER | | |
|---|---|---|---|---|---|
| | F VALUE | AV | | F VALUE | AV |
| ① | F2.5 | 2.644 | ①+ND | F5.0 | 4.644 |
| ② | F2.8 | 2.977 | ②+ND | F5.6 | 4.977 |
| ③ | F3.1 | 3.311 | ③+ND | F6.3 | 5.311 |
| ④ | F3.5 | 3.644 | ④+ND | F7.1 | 5.644 |
| ⑤ | F4.0 | 3.977 | ⑤+ND | F8 | 5.977 |
| ⑥ | F4.5 | 4.311 | ⑥+ND | F9 | 6.311 |
| ⑦ | F5.0 | 4.644 | ⑦+ND | F10 | 6.644 |
| ⑧ | F5.6 | 4.977 | ⑧+ND | F11 | 6.977 |
| ⑨ | F6.3 | 5.311 | ⑨+ND | F13 | 7.311 |
| ⑩ | F7.1 | 5.644 | ⑩+ND | F14 | 7.644 |
| ⑪ | F8 | 5.977 | ⑪+ND | F16 | 7.977 |
| ⑫ | F9 | 6.311 | ⑫+ND | F18 | 8.311 |

| FULL APERTURE F VALUE | 2.5 |
|---|---|
| FULL APERTURE AD | 2.64 |
| ΔAV | 0.3333 |
| ESTIMATED LIGHT REDUCTION BY ND FILTER | 2 |

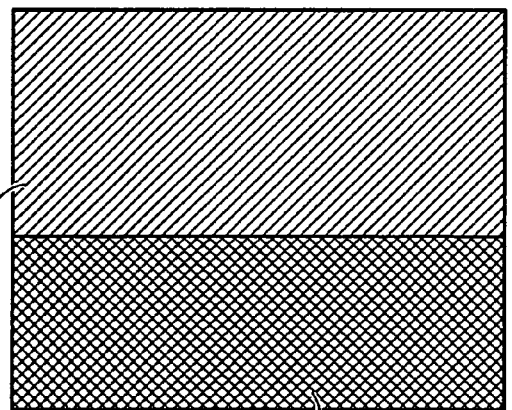

HATCHED CELL: A RANGE WHERE ND FILTER IS NOT REQUIRED IN TERMS OF IMAGE QUALITY (NOT HANDLED BY THE PRESENT INVENTION)

GRAYED CELL: A RANGE WHERE WITH AND WITHOUT ND FILTER INSERTED

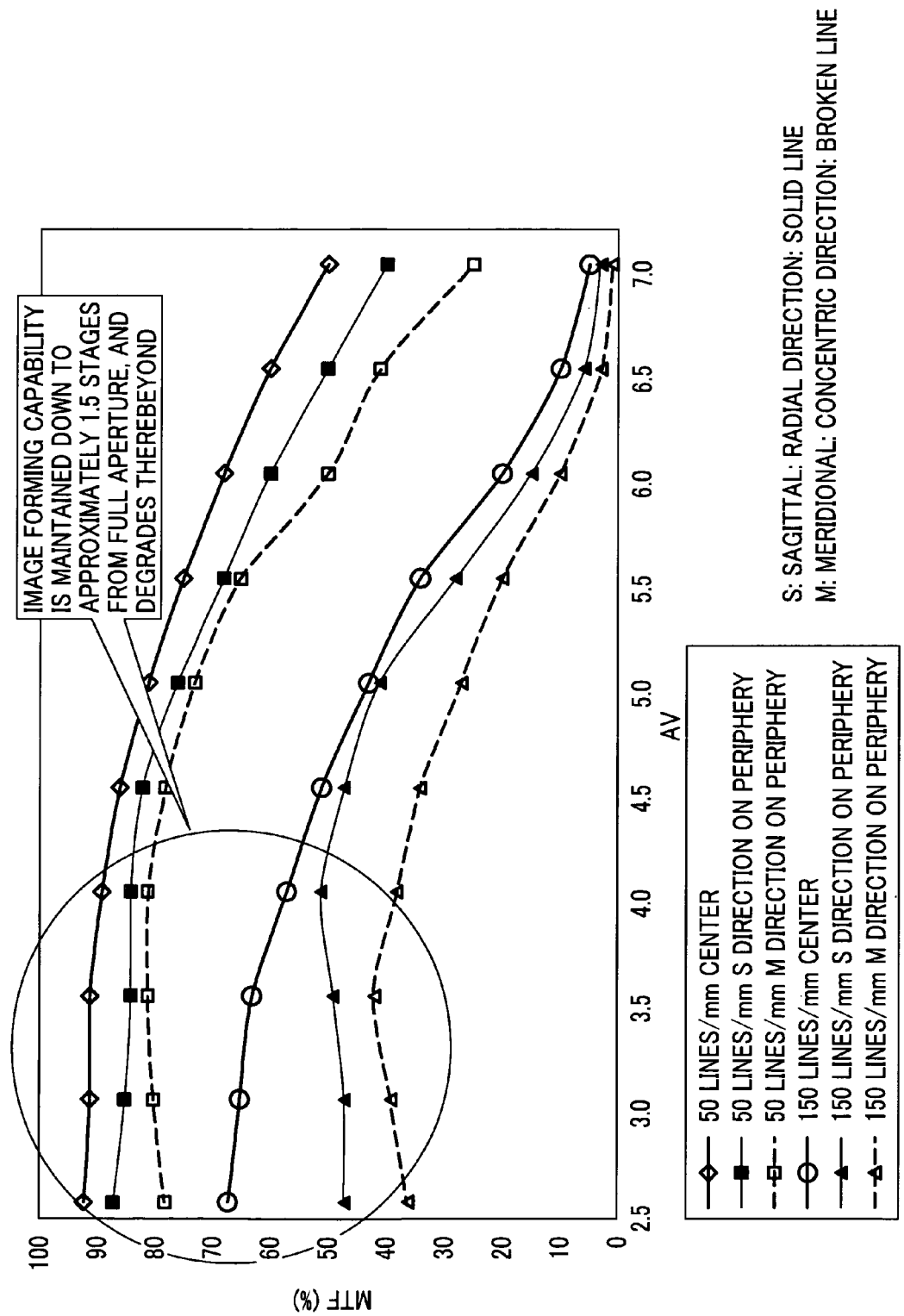

FIG. 12

COMPARISON OF LIGHT REDUCTION METHODS

| | IMAGE FORMING CAPABILITY (MTF) | DEPTH OF FIELD | GHOSTS | PERIPHERAL LIGHT QUANTITY | ELECTRIC POWER (※) |
|---|---|---|---|---|---|
| LIGHT REDUCTION BY APERTURE CONTROL (MULTISTAGE APERTURE) | × EXCESSIVE REDUCTION REDUCES MTF | ○ REDUCING LIGHT QUANTITY BY APERTURE INCREASES DEPTH OF FIELD | ○ REDUCED APERTURE CAN REDUCE GHOSTS | ○ MITIGABLE REDUCTION IN PERIPHERAL LIGHT QUANTITY BY APERTURE | ×× HIGH CONSUMPTION CURRENT DUE TO PULSE MOTOR USE |
| LIGHT REDUCTION BY ND FILTER | △ BASICALLY MAINTAINS MTF AS BEFORE ND FILTER INSERTION | △ LIGHT REDUCTION DOES NOT CHANGE THE DEPTH OF FIELD | × GHOSTS MAY INCREASE DUE TO FRONT AND REAR SURFACES ON ND FILTER | △ LIGHT REDUCTION DOES NOT IMPROVE PERIPHERAL LIGHT QUANTITY | × LOW CONSUMPTION CURRENT THAN THAT OF PULSE MOTOR |

○: IMPROVED AFTER LIGHT REDUCTION
△: SAME AS BEFORE LIGHT REDUCTION
×: DEGRADED AFTER LIGHT REDUCTION
※: ELECTRIC POWER VARIES ACCORDING TO THE TYPE OF DRIVING, AND ASSUMED AS IN GENERAL CONFIGURATION WHERE APERTURE IS DRIVEN BY A PULSE MOTOR, AND ND FILTER IS INSERTED/EXTRACTED BY A MOVING MAGNET IN THE TABLE ABOVE

IMAGE INPUT DEVICE

PRIORITY CLAIM

This application claims priority from Japanese Patent Application No. 2006-202640, filed with the Japanese Patent Office on Jul. 25, 2006, the contents of which are incorporated herein by reference in their entirety.

BACKGROUND OF THE INVENTION

1. Field of the Invention

The present invention relates to an image input device such as a digital camera, and more particularly relates to an image input device intended to improve a light quantity adjusting technology for acquiring a high quality image.

2. Description of the Related Art

In an image input device such as a digital camera which uses image forming optical means which forms an object image by means of an optical system typified by lenses, when the aperture is reduced for imaging an object, the image quality of the object image degrades due to a diffraction phenomenon of light a periphery of the aperture. To address this problem, a high-class camera often employs light reduction means which uses a neutral density (ND) filter or the like to reduce the transmitting light quantity, thereby reducing light without reducing the aperture, resulting in eliminating the necessity of reducing the aperture beyond a certain degree.

On the other hand, in imaging on various cameras, imaging effects by means of the aperture are utilized for artistic expression. The imaging effects by means of the aperture include reducing the aperture to increase the depth of field, thereby focusing in a wide range, resulting in a pan focus-like expression, or conversely, increasing the aperture to decrease the depth of field, thereby defocusing foreground and background other than an intended object, resulting in an expression which shows off the intended object. Particularly, for users referred to as high-end users who freely use high-level imaging techniques, expressions employing these imaging effects by means of the aperture are usual, and they want cameras on which the imaging effects by means of the aperture are available. In order to offer these effects, high-class cameras often employs a multistage aperture which can control the aperture at multiple stages.

To attain the above two requirements, it is efficient to use a multistage aperture which employs an ND filter together with a general multistage aperture. FIG. 2 shows an exterior of an example of a shutter unit on which a multistage aperture together with an ND filter is installed. The multistage aperture 13 generally includes multiple aperture blades, and is configured to employ a pulse motor, for example, to drive the respective aperture blades via a cam, thereby obtaining a desired aperture diameter in FIG. 2. If a pulse motor is employed as a drive source for the multistage aperture 13, the aperture diameter is controlled stepwise, and is generally designed so that the aperture diameter is changed by ½ AV (aperture value, used in a so-called apex system) or ⅓ AV per pulse. The ND filter 15 is generally constructed by affixing a filter member to blade members serving as support members, and controls the transmitting light quantity by moving the blade members forward and backward with respect to the optical axis, thereby inserting/extracting the filter member to/from the optical axis.

In this case, though a large ND filter which can adjust the light quantity in the full aperture may be employed, the filter member constituting the ND filter is expensive, and the ND filter is preferably constructed by a more or less small filter member.

In other words, as long as an exposure control characteristics indicated as exposure charts (refer to FIGS. 3, 4, 5, 6, 8, and 10) can be constituted, an ND filter is to be configured using a smaller filter member which can be applied to a state starting from the aperture is more or less reduced. If an ND filter using a smaller filter member is employed, a mechanism which holds and drives the ND filter can be compact. The example shown in FIG. 2 has a configuration in dimensional relationship that the ND filter 15 can be used when the multistage aperture 13 reduces the aperture value by 1 AV or more from the full aperture.

With the above-described multistage aperture simultaneously employing the ND filter used for high class models, the ND filter can be used at any aperture value ranging from a full aperture state or a nearly full aperture state to a maximally reduced aperture state. As a result, if a certain light reduction quantity is required, there is a case where the light reduction is realized by means of only the multistage aperture and by the multistage aperture along with the ND filter. FIG. 9 shows an example of this case. The reduction by the multistage aperture and the reduction by the multistage aperture along with the ND filter are both available in grayed entries in FIG. 9. FIG. 10 shows this as an exposure chart.

Both the case where the ND filter is not inserted and the case where the ND filter is inserted are present at six stages from F5 to F9 in FIGS. 9 and 10. The full aperture is represented as a circled "1", and the minimum aperture is represented as circled "12" in FIGS. 9 and 10, resulting in 12 stages, and the respective circled numbers represent the stages of the multistage aperture (different from "aperture stages", which are referred to as "nth step of the aperture". "Aperture stage" generally corresponds to an AV value).

Though cases where the ND filter is simultaneously used for the 9th stage (circled "9") to the 12th stage (circled "12") of the multistage aperture are shown in FIGS. 9 and 10, since it is sufficient that an actual camera can be applied up to LV 18 (LV: Light Value, used for the apex system), these four stages of the light reduction states are not used. Moreover, in the example of the multistage aperture shown in FIG. 2, since the ND filter 15 can be used in a state with an aperture value reduced from the full aperture by 1 AV or more, the simultaneous use of the ND filter is not applied to the first stage (circled "1") to the third stage (circled "3"), and since the aperture is not reduced so much in this range, the influence of the degradation of the image quality due to the diffraction is seldom present, and the simultaneous employment of the ND filter is not necessary in terms of the image quality.

If the same light reduction state with respect to a certain luminance of the object is realized by the aperture and the aperture along with the ND filter as described above, there poses a problem of determining which of them is more proper to use. The advantages and disadvantages of the light reduction only by the multistage aperture and the light reduction only by the ND filter are compared in FIG. 12.

The most important thing for image input devices such as a camera is how to acquire a better image quality, and a problem to be considered with this respect is the above-described problem of the image degradation upon a small aperture. The main reason for employing the ND filter as the light reduction means is to address the degradation of the image quality upon the small aperture. The employment of the ND filter eliminates the necessity of a small aperture, thereby eliminating the degradation of the image quality. FIG. 11 shows an example of a relationship between the aperture and an image forming capability (MTF) corresponding to the image quality. Thought the MTF can be maintained to a somewhat proper value from the full aperture to an aperture reduced by approximately 1.5 stages as shown in FIG. 11, if the aperture is reduced further, the MTF apparently degrades. In order to prevent the MTF from degrading, it is preferable to additionally employ the light reduction by the ND filter so as to eliminate the necessity of using a small aperture.

On the other hand, the reason for employing the multistage aperture is to control the depth of field according to the intention of a photographer. It is necessary to reduce the aperture by means of the multistage aperture thereby increasing the depth of field in order to focus in a wide range from a near view to a distant view.

Moreover, there is a difference between the light reduction by the multistage aperture, and the light reduction by the ND filter in terms of problems of ghosts and a reduction of quantity of light on periphery. In terms of the ghosts, the light reduction by the ND filter, which inserts an ND filter, is disadvantageous due to an increase of reflecting surfaces, and if ghosts are blocked by an aperture, the ghosts are reduced by reducing the aperture by means of the multistage aperture. In terms of the reduced quantity of light on periphery, in general, if the aperture is reduced by control, though the light quantity becomes uniform, and the reduction of the quantity of light on periphery is improved, the ND filter does not improve the reduction of the quantity of light on periphery.

Moreover, in terms of power consumption, there is a difference between the light reduction by the multistage aperture, and the light reduction by the ND filter. In general, the multistage aperture is often driven by a pulse motor, and the pulse motor including two coils tends to consume a more electric power. The ND filter moves only between an inserted position and a retracted position with respect to the optical axis, and it is thus possible to employ a moving magnet including a single coil, resulting in a small amount of the power consumption. The best strategy to reduce the power consumption is to reduce the movement as much as possible for both of them.

In view of the foregoing technical background, an imaging device which provides control to selectively switch to the optimal camera control method according to the advantages and disadvantages of the light reduction by the multistage aperture and the light reduction by the ND filter is proposed in Japanese Patent Laid-Open No. 2003-134393, for example. More specifically, the imaging device according to Japanese Patent Laid-Open No. 2003-134393 includes exposure control means which controls aperture control means and transmittance control means, which employs an ND filter or the like, in combination, and the exposure control means includes a first operation mode which controls the aperture control means and the transmittance control means preferentially for the depth of field. Moreover, the exposure control means includes, in addition to the first operation mode, a second operation mode which controls the aperture control means and the transmittance control means preferentially for resolution, and provides control for switching between the first operation mode and the second operation mode according to imaging conditions.

The present applicant improves the system disclosed in Japanese Patent Laid-Open No. 2003-134393, and proposes a technology which minimizes the use of the control means, which changes the transmittance by means of the ND filter or the like, as Japanese Patent Laid-Open No. 2007-114283.

The applicant focused on the problem of ghosts which are generated by the ND filter in order to further improve prior art thereby acquiring image which more suits an intention of a photographer.

An item "GHOSTS" in FIG. 12 is first studied in detail.

If the aperture is reduced, ghosts can be reduced compared with the case of the full aperture in the control by the aperture while ghosts may increase and the image quality may degrade since the reflecting surfaces are increased by the insertion of the ND filter in the control by the ND filter. Especially, if a surface perpendicular to the optical axis such as an ND filter is present close to the position of the aperture, there occurs reflection between the ND filter and some surfaces close to an imaging element such as a CCD (Charge Coupled Device) such as a low-pass filter, a cover glass plate of the imaging element, and the imaging surface itself similarly perpendicular to the optical axis, thereby often causing ghosts.

FIG. 13 is a schematic view showing a principle of the generation of an example of ghosts due to the ND filter. A light beam returns toward an aperture after reflected by a low-pass filter, a cover glass plate, an imaging element, or an imaging plane itself as a first reflecting surface, is reflected again on a rear surface of an ND filter as a second reflecting surface, and reaches the imaging plane resulting in a ghost. This is a major principle of the ghosts caused by the ND filter. The fact that the first reflecting surface is a flat surface close to the imaging plane implies that light on an acquired image plane is a cause of the ghosts, which corresponds to a case which occurs when an image is taken while the sun is present in the image plane, for example, is generally considered as "a sever condition where generation of ghosts is unavoidable", and is often permitted. However, for a high class model employing the multistage aperture, it is preferable to reduce ghosts as much as possible even under this sever condition since such an image is often taken by intention.

SUMMARY OF THE INVENTION

An object of the present invention is to provide an image input device which especially restrains generation of ghosts caused by the second light reduction means which adjusts a transmittance control method of light if there is a high luminance portion such as the sun on an image plane of an object image, thereby acquiring an image with a higher quality.

To accomplish the above object, an image input device according to one embodiment of the present invention includes an optical unit which forms an object image at a predetermined position, a first light reduction unit which is disposed on an optical axis of said optical unit and reduces a quantity of passing light by changing a size of an aperture, a second light reduction unit which is disposed on the optical axis of said optical unit, and reduces a quantity of passing light by changing transmittance for the passing light, an object determining unit which determines whether a strong light source is present on the object image formed by said optical unit based on luminance distribution on the object image, and a control unit which controls said first and second light reduction units in order to obtain a proper exposure to pickup the object image, and causes said first light reduction unit preferentially to function if said object determining unit determines that a strong light source is present on the object image.

Advantageously, the object determining means includes means that determines that a strong light source is present on the object if a luminance portion exceeding a predetermined luminance on an image plane of the object image.

Advantageously, the object determining means includes means that determines that a strong light source is present on the object if a ratio of a luminance of a portion on an image plane of the object image exceeding a predetermined luminance to an average luminance of the image plane exceeds a predetermined value.

Advantageously, the second light reduction means includes an ND filter.

Advantageously, the first light reduction means includes a multistage aperture which controls the opening of the aperture at multiple stages.

The present invention can provide an image input device including first light reduction means that reduces a quantity of passing light by changing an aperture, and second light reduction means that reduces a quantity of passing light by changing the transmittance for the passing light, and detecting and recognizing a state where ghosts tend to occur due to the second light reduction means, thereby efficiently avoiding generation of ghosts.

In other words, the image input device according to the first aspect of the invention includes optical means that forms an object image at a predetermined position, first light reduction means that is disposed on an optical axis of the optical means, and reduces a quantity of passing light by changing an aperture, second light reduction means that is disposed on the optical axis of the optical means, and reduces a quantity of passing light by changing the transmittance for the passing light, object determining means that determines whether a strong light source is present on the object image formed by the optical means based on an luminance distribution on the object image, and control means that controls the first and second light reduction means in order to obtain a proper exposure to acquire the object image, and causes the first light reduction means preferentially to function if the object determining means determines that a strong light source is present on the object image, and especially restrains generation of ghosts caused by the second light reduction means which adjusts the transmittance of light if there is a high luminance portion such as the sun on an image plane of the object image, thereby acquiring image with a higher quality.

Moreover, the image input device according to the second aspect of the invention includes optical means that forms an object image at a predetermined position, first light reduction means that is disposed on an optical axis of the optical means, and reduces a quantity of passing light by changing an aperture, second light reduction means that is disposed on the optical axis of the optical means, and reduces a quantity of passing light by changing the transmittance for the passing light, object determining means that determines whether a strong light source is present on the object image formed by the optical means based on an luminance distribution on the object image, mode setting means that selectively sets an imaging mode for acquiring the object image including an imaging mode requiring a high image quality, and control means that controls the first and second light reduction means in order to obtain a proper exposure to acquire the object image, causes the second light reduction means preferentially to function if the mode setting means sets the imaging mode requiring the high image quality, and causes the first light reduction means preferentially to function only if the mode setting means sets the imaging mode requiring the high image quality, but the object determining means determines that a strong light source is present on the object image, and, especially when the second light reduction means which adjusts the transmittance of light is used preferentially for increasing the image quality, restrains generation of ghosts caused by the second light reduction means if there is a high luminance portion such as the sun on an image plane of the object image, thereby stably acquiring image with a high quality.

Further, the image input device according to the third aspect of the invention includes optical means that forms an object image at a predetermined position, first light reduction means that is disposed on an optical axis of the optical means, and reduces a quantity of passing light by changing an aperture, second light reduction means that is disposed on the optical axis of the optical means, and reduces a quantity of passing light by changing the transmittance for the passing light, object determining means that determines whether a strong light source is present on the object image formed by the optical means based on an luminance distribution on the object image, mode setting means that selectively sets an imaging mode for acquiring the object image including a full-automatic imaging mode requiring no specific operation by a user, and control means that controls the first and second light reduction means in order to obtain a proper exposure to acquire the object image, causes the second light reduction means preferentially to function if the mode setting means sets the full-automatic imaging mode, and causes the first light reduction means preferentially to function only if the mode setting means sets the full-automatic imaging mode, but the object determining means determines that a strong light source is present on the object image, and, especially when the second light reduction means which adjusts the transmittance of light is used preferentially according to an automatic imaging control, restrains generation of ghosts caused by the second light reduction means if there is a high luminance portion such as the sun on an image plane of the object image, thereby acquiring image with a higher quality.

In the image input device of the present invention, the object determining means includes means that determines that a strong light source is present on the object if a luminance portion exceeding a predetermined luminance on an image plane of the object image, and can especially easily determine a presence of a high luminance portion such as the sun on an image plane of the object image, which causes generation of ghosts, according to a simple process.

In the image input device of the present invention, the object determining means includes means that determines that a strong light source is present on the object if a ratio of a luminance of a portion on an image plane of the object image exceeding a predetermined luminance to an average luminance of the image plane exceeds a predetermined value, and can especially more precisely determine a presence of a high luminance portion such as the sun on an image plane of the object image, which causes generation of ghosts.

In the image input device of the present invention, the second light reduction means includes an ND filter, and can especially allow the second light reduction means which adjusts the transmittance of light to be easily configured.

In the image input device of the present invention, the first light reduction means includes a multistage aperture which controls the opening of the aperture at multiple stages, and can especially precisely and properly adjust the aperture of the first light reduction means that adjusts the aperture.

BRIEF DESCRIPTION OF THE DRAWINGS

These and other features, aspects, and advantages of the present invention will become better understood with regard to the following description, appended claims, and accompanying drawings.

FIG. 9 is a table showing an example of simultaneous use of the multistage aperture and the ND filter used for the exposure control of the digital cameras according to the embodiments of the present invention;

FIG. 11 is a chart showing a relationship between an aperture and an image resolution capability (MTF) of an example of an imaging optical system used for a digital camera;

FIG. 12 is a table comparing light reduction by a multistage aperture and light reduction by an ND filter used to reduce exposure light quantity in an image input device such as a digital camera.

DETAILED DESCRIPTION OF THE INVENTION

A detailed description will now be given of an image input device according to the present invention based on embodiments of the present invention with reference to drawings.

Figure 1:
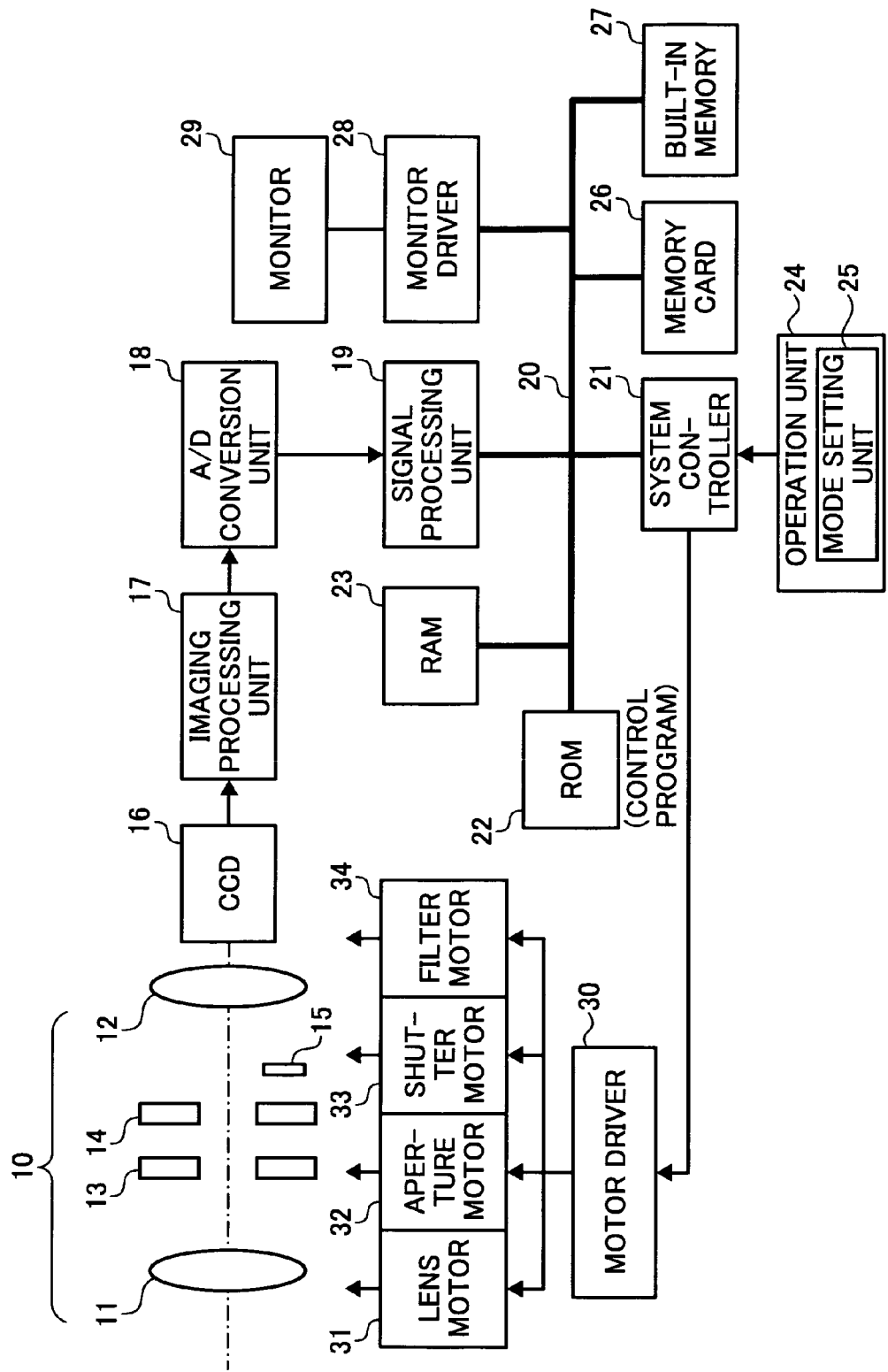
FIG. 1 is a block diagram schematically showing a configuration of principal parts of a digital camera according to embodiments of an image input device of the present invention.
Figure 2:
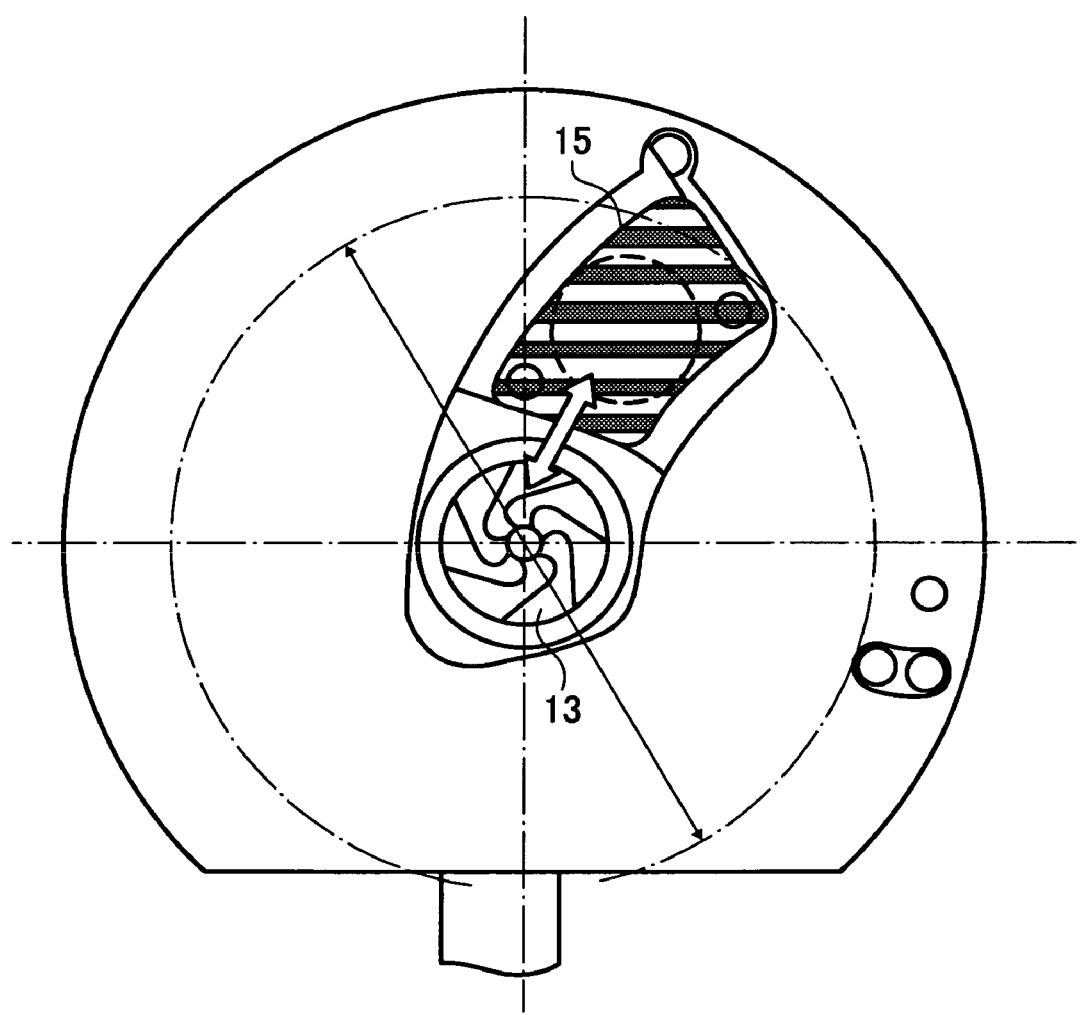
FIG. 2 is a rear view schematically showing a configuration of a shutter unit including a multistage aperture and an ND filter used for the digital camera shown in FIG. 1.

FIGS. 1 and 2 describe configurations of a digital camera as an embodiment of the image input device according to the present invention, FIG. 1 is a block diagram showing a configuration of a control system of the digital camera, and FIG. 2 is a rear view schematically showing a configuration of a shutter unit with a multistage aperture which can employ an ND filter used for the digital camera shown in FIG. 1.

The digital camera shown in FIG. 1 includes a first lens group 11, a second lens group 12, a multistage aperture 13, a shutter 14, an ND filter 15, a solid-state imaging device 16, an imaging processing unit 17, an A/D (analog/digital) conversion unit 18, a signal processing unit 19, a bus line 20, a system controller 21, a ROM (Read Only Memory) 22, a RAM (Random Access Memory) 23, an operation unit 24, a mode setting unit 25, a memory card 26, a built-in memory 27, a monitor driver 28, a monitor 29, a motor driver 30, a lens motor 31, an aperture motor 32, a shutter motor 33, and a filter motor 34.

The first lens group 11, the second lens group 12, the multistage aperture 13, the shutter 14, and the ND filter 15 are built into an imaging lens-barrel, not shown, and constitute optical means 10 which forms an object image. The first lens group 11 and the second lens group 12 constitute an imaging lens, and focusing is carried out by moving either one or both of the first lens group 11 and the second lens group 12 along an optical axis. A zooming mechanism, which carries out zooming by moving the first lens group 11 and the second lens group 12 independently, and in association with each other along a predetermined trajectory, may be built in. The multistage aperture 13, the shutter 14, and the ND filter 15 are built in between the first lens group 11 and the second lens group 12. These multistage aperture 13, the shutter 14, and the ND filter 15 are often configured as a shutter unit 40 as shown in FIG. 2. It should be noted that the multistage aperture 13 includes an aperture mechanism which can move multiple aperture blades, for example, to adjust the aperture at multiple stages, and the shutter 14 opens and closes the aperture. Though the multistage aperture 13 and the shutter 14 may be configured independently, the multistage aperture 13 may open and close an opening by means of the aperture blades thereby providing the functions of both the multistage aperture 13 and the shutter 14 by the single mechanism using the same aperture blades. The ND filter 15 is configured to move forward/backward in a direction approximately perpendicular to the optical axis, thereby being inserted onto, and being retracted from an optical path.

The first lens group 11 and the second lens group 12 are driven along the optical axis by the lens motor 31, the opening of the multistage aperture 13 is adjusted by the aperture motor 32, the shutter 14 is driven to open/close by the shutter motor 33, and the ND filter 15 is driven forward/backward to/from the optical axis by the filter motor 34. The drive of the respective motors 31 to 34 is controlled by the motor driver 30 controlled by the system controller 21.

The first lens group 11 and the second lens group 12 of the optical means 10 forms an object optical image on an input plane of the solid-state imaging element 16 such as a charge coupled device (CCD) image sensor, and the solid-state imaging element 16 converts the object optical image into electric signals of respective pixels. The electric signal of the respective pixels of the solid-state imaging element 16 are extracted by the imaging processing unit 17, are converted into digital signals by the A/D conversion unit 18, and are input to the signal processing unit 19. The signal processing unit 19, the system controller 21, the ROM 22 storing a control program, a RAM 23 storing data, the detachable memory card 26, the built-in memory 27, and the monitor driver 28 are mutually connected with each other via the bus line 20. The system controller 21 includes a central processing unit (CPU) configured by a microprocessor, for example, and controls the system of the digital camera based on an operation input from the operation unit 24, and other input data according to the control program stored in the ROM 22.

The operation unit 24 includes a mode setting unit 25 used to set an operation mode of the digital camera to the system controller 21. The monitor driver 28 drives the monitor 29 such as a liquid crystal display (LCD) according to control of the system controller 21, displays an acquired object image on a screen of the monitor 29 in real time, or properly displays acquired images in the memory card 26 and the built-in memory 27 and other various imaging data on the monitor 29.

The shutter unit shown in FIG. 2 includes the shutter 14 (which may be constituted by independent shutter blades, or whose function may be provided by the multistage aperture 13), which is not clearly shown in FIG. 2, as well as the multistage aperture 13 and the ND filter 15. The multistage aperture 13 generally includes multiple aperture blades, and employs a pulse motor, for example, to drive the respective aperture blades via a cam, thereby obtaining a desired aperture diameter. If a pulse motor is employed as a drive source for the multistage aperture 13, the aperture diameter is controlled stepwise, and is generally designed so that the aperture diameter is changed by ½ AV or ⅓ AV per pulse. The ND filter 15 is constructed by affixing a filter member 15b to blade members 15a serving as support members, and controls the transmitting light quantity by moving the blade member forward and backward to/from the optical axis, thereby inserting/extracting the filter member to/from the optical axis. In this case, though a large ND filter which can adjust the light quantity for the full aperture may be used, the filter member constituting the ND filter is expensive, and the ND filter is preferably constructed by a more or less small filter member.

In other words, as long as exposure control characteristics indicated as exposure charts (refer to FIGS. 3, 4, 5, 6, 8, and 10) of exposure control programs can be constituted, the ND filter is to be configured using a smaller filter member which can be applied to a state starting from the aperture is more or less reduced. If an ND filter using a smaller filter member is employed, a mechanism which holds and drives the ND filter can be compact. The example shown in FIG. 2 has a configuration in dimensional relationship that the ND filter 15 can be used when the multistage aperture 13 reduces the aperture value by 1 AV or more from that for the full aperture.

The specific configuration of the multistage aperture 13 may be arbitrary one which can adjust the aperture, such as aperture diameter at multiple stages. The configuration of the operation mechanism of the ND filter 15 is not limited to the above configuration, and may be an arbitrary configuration which can insert/retract the ND filter 15 into/from the optical axis of the imaging optical path.

As described above, the image input device according to the present invention includes optical means that forms an object image at a predetermined position, first light reduction means that is disposed on an optical axis of the optical means, and reduces a quantity of passing light by changing an aperture, second light reduction means that is disposed on the optical axis of the optical means, and reduces a quantity of passing light by changing the transmittance for the passing light, object determining means that determines whether a strong light source is present on the object image formed by the optical means based on an luminance distribution on the object image, and control means that controls the first and second light reduction means in order to obtain a proper exposure to acquire the object image, and further includes at least one of the following characteristics. (1) The control means causes the first light reduction means preferentially to function if the object determining means determines that a strong light source is present on the object image. (2) The image input device includes mode setting means that selectively sets an imaging mode for acquiring the object image including an imaging mode requiring a high image quality, and the control means causes the second light reduction means preferentially to function if the mode setting means sets the imaging mode requiring the high image quality, and causes the first light reduction means preferentially to function only if the mode setting means sets the imaging mode requiring the high image quality, but the object determining means determines that a strong light source is present on the object image. (3) The image input device includes mode setting means that selectively sets an imaging mode for acquiring the object image including a full-automatic imaging mode requiring no specific operation by a user, and the control means causes the second light reduction means preferentially to function if the mode setting means sets the full-automatic imaging mode, and causes the first light reduction means preferentially to function only if the mode setting means sets the full-automatic imaging mode, but the object determining means determines that a strong light source is present on the object image.

In other words, if the first light reduction means is caused to function preferentially, the second light reduction means is used as less as possible, and the first light reduction means is used as much as possible for adjusting the light quantity, namely, the quantity of light is adjusted by the control of the size of the aperture and the shutter speed as much as possible, and the quantity of light is adjusted by the transmittance as less as possible. Then, if the second light reduction means is caused to function preferentially, the first light reduction means is used as less as possible, and the second light reduction means is used as much as possible for adjusting the light quantity, namely, the quantity of light is adjusted by the control of the light reduction by means of the transmittance and the shutter speed as much as possible, and the quantity of light is adjusted by the size of the aperture as less as possible. The multistage aperture 13 corresponds to the first light reduction means, and the ND filter 15 corresponds to the second light reduction means in FIGS. 1 and 2. The system controller 21, which operates according to the control program stored in the ROM 22, corresponds to the control means in FIG. 1. The system controller 21, which operates according to the control program stored in the ROM 22, functions also as the object determining means along with the solid-state imaging element 16, the imaging processing unit 17, the A/D conversion unit 18, and the signal processing unit 19. Moreover, the mode setting unit 25 of the operation unit 24 functions as the mode setting means, and the system controller 21 carries out the light quantity adjusting operation according to the operation mode set by this mode setting unit 25. A specific description will now be given of the control operation of the first and second light reduction means in various operation modes.

Figure 3:
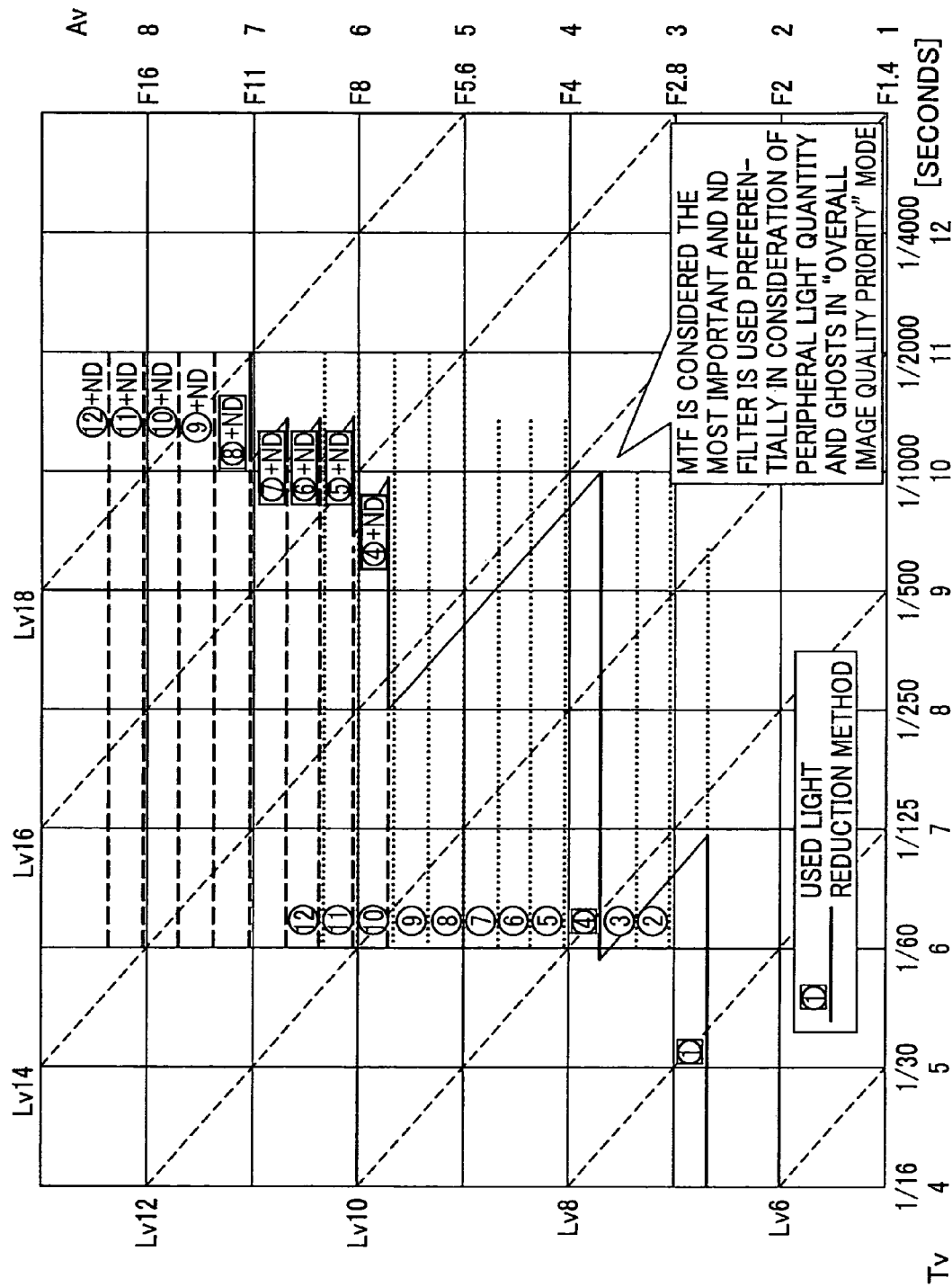
FIG. 3 is an exposure chart showing an exposure control characteristic in a normal state in an overall image quality priority mode of a digital camera according to a first embodiment of the present invention.

A description will now be given of control for a normal object in an overall image quality priority mode, which is a first embodiment of the image input device according to the present invention, namely normal control in the overall image quality priority mode, with reference to an exposure chart shown in FIG. 3. An optimal high quality image is to be acquired in consideration of ghosts and a quantity of light on periphery in addition to the image forming capability (MTF) shown in FIG. 11 in this overall image quality priority mode, and the overall image quality priority mode in the normal state shown in FIG. 3 is a case where an extremely high luminance portion such as the sun, which causes ghosts, is not present on the image plane of the object image. As described with reference to FIG. 11, if the aperture of the multistage aperture 13 is reduced to reduce the aperture diameter, though the resolution, which determines the image forming capability, decreases, the image forming capability does not largely degrade down to approximately −1.5 AV, and there hardly poses a problem even if the degradation of the image forming capability is not considered down to approximately −1 AV (with this respect, as described with reference to FIG. 2, the ND filter 15 can be used only in the state where the multistage aperture 13 is closed from the full aperture by 1 AV or more). In contrast, ghosts may be reduced when the multistage aperture is closed from the full aperture even a little. Moreover, the quantity of light on periphery is apparently improved by closing the aperture even a little.

The overall image quality priority mode whose exposure chart is shown in FIG. 3 is the setting to acquire comprehensive proper image quality in consideration of these conditions.

In FIG. 3, the horizontal axis represents the shutter speed and a time value (TV, exposure period, or shutter-open period, used for the apex system) corresponding thereto, and the vertical axis represents the aperture value by the first light reduction means, and an AV corresponding thereto. In other words, in terms of the exposure period, TV4, TV5, TV6, TV7, TV8, TV9, TV10, TV11, and TV12 respectively correspond to 1/16 seconds, 1/30 seconds, 1/60 seconds, 1/125 seconds, 1/250 seconds, 1/500 seconds, 1/1000 seconds, 1/2000 seconds, and 1/4000 seconds, and, in terms of the aperture, AV1, AV2, AV3, AV4, AV5, AV6, AV7, and AV8 respectively correspond to F1.4, F2, F2.8, F4, F5.6, F8, F11, and F16. Circled numbers represent respective stages of the aperture adjustment for the adjustment of the quantity of light, and the light quantity can be adjusted in a 1/3-AV or 1/3-LV increment. Bold lines parallel with the horizontal axis indicate a program of a used light reduction.

The exposure control is carried out from a state with a small LV to a state with a large LV, which correspond to object luminance, in the exposure chart in FIG. 3 in the following manner.

Circled "1" corresponding to the smallest LV represents a full aperture state of the multistage aperture 13 (corresponding to F2.5), and the exposure quantity is controlled by switching the shutter speed in a range from 1/16 seconds to 1/125 seconds stepwise according to the object luminance for this aperture. A state where the aperture is the full aperture represented by the circled "1", and the shutter speed is 1/125 seconds transitions to a state where the same LV is provided by a shutter speed (1/60 seconds) while the multistage aperture 13 is closed from the full aperture by 1 AV, which is represented by circled "4". Circled "4" represents the state where the multistage aperture 13 is closed by 1 AV, and the exposure quantity is controlled by switching the shutter speed stepwise in a range from 1/60 seconds to 1/1000 seconds according to the object luminance in this aperture state.

Then, a state where the multistage aperture 13 is closed by 1 stage (1 AV) from the full aperture, which is represented by circled "4", and the shutter speed is 1/1000 seconds transitions to a state where the same LV is provided by a shutter speed (1/250 seconds) while the multistage aperture 13 is closed by 1 stage (1 AV) from the full aperture to a state represented by circled "4" and the ND filter 15 as the second light reduction means is added. While the multistage aperture 13 is closed by 1 stage (circled "4"), and the ND filter 15 is simultaneously used, the exposure quantity is controlled by switching the shutter speed stepwise in a range from 1/250 seconds to 1/1000 seconds according to the object luminance. Further, a state where the state of the multistage aperture 13 is circled "4", the ND filter 15 is simultaneously used, and the shutter speed is 1/1000 seconds transitions to a state where the same LV is provided by a shutter speed (approximately 1/800 seconds) while the multistage aperture 13 is further closed by 1 stage (1/3 AV), which is represented by circled "5", and corresponds to F4, and the ND filter 15 is simultaneously used. While the state of the multistage aperture 13 is circled "5", and the ND filter 15 is simultaneously used, the exposure quantity is controlled by switching the shutter speed stepwise in a range from approximately 1/800 seconds to approximately 1/1300 seconds according to the object luminance. A state where the state of the multistage aperture 13 is circled "5", the ND filter 15 is simultaneously used, and the shutter speed is approximately 1/1300 seconds transitions to a state where the same LV is provided by a shutter speed (approximately 1/1000 seconds) while the multistage aperture 13 is further closed by 1 stage (1/3 AV), which is represented by circled "6", and the ND filter 15 is simultaneously used.

While the state of the multistage aperture 13 is circled "6", and the ND filter 15 is simultaneously used, the exposure quantity is controlled by switching the shutter speed stepwise in a range from approximately 1/1000 seconds to approximately 1/1300 seconds according to the object luminance. Then, a state where the state of the multistage aperture 13 is circled "6", the ND filter 15 is simultaneously used, and the shutter speed is approximately 1/1300 seconds transitions to a state where the same LV is provided by a shutter speed (slightly more than 1/1000 seconds) while the multistage aperture 13 is further closed by 1 stage (1/3 AV), which is represented by circled "7", and the ND filter 15 is simultaneously used. While the state of the multistage aperture 13 is circled "7", and the ND filter 15 is simultaneously used, the exposure quantity is controlled by switching the shutter speed stepwise in a range from slightly more than 1/1000 seconds to approximately 1/1300 seconds according to the object luminance. A state where the state of the multistage aperture 13 is circled "7", the ND filter 15 is simultaneously used, and the shutter speed is approximately 1/1300 seconds transitions to a state where the same LV is provided by a shutter speed (slightly more than 1/1000 seconds) while the multistage aperture 13 is further closed by 1 stage (1/3 AV), which is represented by circled "8", and corresponds to F5.6, and the ND filter 15 is simultaneously used. While the state of the multistage aperture 13 is circled "8", and the ND filter 15 is simultaneously used, the exposure quantity is controlled by switching the shutter speed stepwise in a range from slightly more than 1/1000 seconds to 1/2000 seconds according to the object luminance.

In this way, in the normal object state in the overall image quality priority mode, the ND filter 15 is simultaneously used while the multistage aperture 13 is closed by 1 stage from the full aperture, and the area where a proper exposure is obtained by switching the shutter speed is set relatively wide, and it is not necessary to close the multistage aperture excessively by simultaneously using the ND filter 15 even if the object luminance becomes high. This configuration prevents the resolution from decreasing due to a small aperture.

With reference to an exposure chart shown in FIG. 4, a description will now be given of an overall image quality priority mode with possible ghosts where, for example, the object determining means which is the system controller 21, which operates according to the control program stored in the ROM 22, and functions along with the solid-state imaging element 16, the imaging processing unit 17, the A/D conversion unit 18, and the signal processing unit 19, recognizes by detecting and discriminating the luminance distribution on the image plane of the object image that a high luminance object such as the sun or an illumination is present in the image in the overall image quality priority mode, which is the above first embodiment of the image input device according to the present invention, namely ghosts possibly occur. The exposure control in the overall image quality priority mode with possible ghosts is different from the control operation in the normal state shown in FIG. 3, and prevents ghosts from generating as much as possible, and minimizes influence of a decrease in the resolution caused by the diffraction.

In other words, the exposure control is carried out from a state with a small LV to a state with a large LV, which correspond to object luminance, in the exposure chart in FIG. 4 in the following manner.

Circled "1" corresponding to the smallest LV represents the full aperture state of the multistage aperture 13 (corresponding to F2.5), and the exposure quantity is controlled by switching the shutter speed in a range from 1/16 seconds to 1/125 seconds stepwise according to the object luminance for this aperture. A state where the aperture is the full aperture represented by the circled "1", and the shutter speed is 1/125 seconds transitions to a state where the same LV is provided by a shutter speed (1/60 seconds) while the multistage aperture 13 is closed from the full aperture by 1 AV, which is represented by circled "4". Circled "4" represents the state where the multistage aperture 13 is closed by 1 AV, and the exposure quantity is controlled by switching the shutter speed stepwise in a range from 1/60 seconds to 1/1000 seconds according to the object luminance in this aperture state (the preceding part is the same as the overall image quality priority mode in the normal state shown in FIG. 3).

Then, a state where the state of the multistage aperture 13 is circled "4", and the shutter speed is 1/1000 seconds transitions to a state where the same LV is provided by a shutter speed (approximately 1/800 seconds) while the multistage aperture 13 is closed by 1 stage (1/3 AV) from the state of circled "4", which is represented by circled "5", and corresponds to F4 (AV4). While the state of the multistage aperture 13 is circled "5", the exposure quantity is controlled by switching the shutter speed stepwise in a range from approximately 1/800 seconds to approximately 1/1300 seconds according to the object luminance. Then, a state where the state of the multistage aperture 13 is circled "5", and the shutter speed is approximately 1/1300 seconds transitions to a state where the same LV is provided by a shutter speed (slightly more than 1/1000 seconds) while the multistage aperture 13 is further closed by 1 stage (1/3 AV), which is represented by circled "6". While the state of the multistage aperture 13 is circled "6", the exposure quantity is controlled by switching the shutter speed stepwise in a range from slightly more than 1/1000 seconds to approximately 1/1300 seconds according to the object luminance. Then, a state where the state of the multistage aperture 13 is circled "6", and the shutter speed is approximately 1/1300 seconds transitions to a state where the same LV is provided by a shutter speed (slightly more than 1/1000 seconds) while the multistage aperture 13 is further closed by 1 stage (1/3 AV), which is represented by circled "7". While the state of the multistage aperture 13 is circled "7", the exposure quantity is controlled by switching the shutter speed stepwise in a range from slightly more than 1/1000 seconds to approximately 1/1300 seconds according to the object luminance.

Further, a state where the state of the multistage aperture 13 is circled "7", and the shutter speed is approximately 1/1300 seconds transitions to a state where the same LV is provided by a shutter speed (slightly more than 1/1000 seconds) while the multistage aperture 13 is further closed by 1 stage (1/3 AV), which is represented by circled "8", and corresponds to F5.6 (AV5). While the state of the multistage aperture 13 is circled "8", the exposure quantity is controlled by switching the shutter speed stepwise in a range from slightly more than 1/1000 seconds to 1/2000 seconds according to the object luminance. Then, a state where the state of the multistage aperture 13 is circled "8", and the shutter speed is 1/2000 seconds transitions to a state where the same LV is provided by a shutter speed (approximately 1/1500 seconds) while the multistage aperture 13 is further closed by 1 stage (1/3 AV), which is represented by circled "9". While the state of the multistage aperture 13 is circled "9", the exposure quantity is controlled by switching the shutter speed stepwise in a range from approximately 1/1500 seconds to 1/2000 seconds according to the object luminance. Then, a state where the state of the multistage aperture 13 is circled "9", and the shutter speed is 1/2000 seconds transitions to a state where the same LV is provided by a shutter speed (approximately 1/1500 seconds) while the multistage aperture 13 is further closed by 1 stage (1/3 AV), which is represented by circled "10". While the state of the multistage aperture 13 is circled "10", the exposure quantity is controlled by switching the shutter speed stepwise in a range from approximately 1/1500 seconds to 1/2000 seconds according to the object luminance.

Further, a state where the state of the multistage aperture 13 is circled "10", and the shutter speed is 1/2000 seconds transitions to a state where the same LV is provided by a shutter speed (approximately 1/1500 seconds) while the multistage aperture 13 is further closed by 1 stage (1/3 AV), which is represented by circled "11", and corresponds to F8 (AV6). While the state of the multistage aperture 13 is circled "11", the exposure quantity is controlled by switching the shutter speed stepwise in a range from approximately 1/1500 seconds to 1/2000 seconds according to the object luminance. Then, a state where the state of the multistage aperture 13 is circled "11", and the shutter speed is 1/2000 seconds transitions to a state where the same LV is provided by a shutter speed (approximately 1/1500 seconds) while the multistage aperture 13 is further closed by 1 stage (1/3 AV), which is represented by circled "12". While the state of the multistage aperture 13 is circled "12", the exposure quantity is controlled by switching the shutter speed stepwise in a range from approximately 1/1500 seconds to 1/2000 seconds according to the object luminance. Then, a state where the state of the multistage aperture 13 is circled "12", and the shutter speed is 1/2000 seconds transitions to a state where the same LV is provided by a shutter speed (approximately 1/1200 seconds) while the multistage aperture 13 is set to a state which is represented by circled "8", and corresponds to F5.6, and the ND filter 15 is simultaneously used. While the state of the multistage aperture 13 is circled "8", and the ND filter 15 is simultaneously used, the exposure quantity is controlled by switching the shutter speed stepwise in a range from approximately 1/1200 seconds to 1/2000 seconds according to the object luminance.

In this way, in the overall image quality priority mode with possible ghosts where the object state tends to cause ghosts, the program is configured so as to employ the ND filter 15 as less as possible, which is different from the normal state, and the aperture is changed by a smaller stage so as to provide an aperture as large as possible in order to minimize the influence of the decrease of the resolution due to the diffraction at a small aperture. As for the decrease of the resolution (MTF) when the aperture is decreased, refer to an example of changes of the resolution (MTF) corresponding to the change of the aperture shown in FIG. 11.

In the overall image quality priority mode of the above embodiment, for a normal object, a proper exposure is provided to acquire an image with a higher quality such that the adjustment of the quantity of light by the multistage aperture, which is the first light reduction means, is given priority down to the predetermined size of the aperture, and if the exposure is reduced further from the predetermined size, the adjustment of the quantity of light by means of the ND filter, which is the second light reduction means, is given priority, especially, the ND filter is simultaneously used in the state where the multistage aperture is closed by 1 stage from the full aperture, the area where a proper exposure is provided by switching the shutter speed is set relatively wide preferentially, and even if the object luminance increases, the simultaneous use of the ND filter eliminates the necessity to largely decrease the multistage aperture, thereby preventing the resolution from decreasing due to a small aperture.

In this overall image quality priority mode, for example, if the object determining means which is the system controller 21, which operates according to the control program stored in the ROM 22, and functions along with the solid-state imaging element 16, the imaging processing unit 17, the A/D conversion unit 18, and the signal processing unit 19, determines by detecting and discriminating the luminance distribution on the image plane of the object image that a high luminance object such as the sun or an illumination is present on the image plane, namely ghosts possibly occur, the system controller 21 enters the operation for possible ghosts. The exposure control in the overall image quality priority mode with possible ghosts is different from the control operation in the normal state described above, and prevents ghosts from generating as much as possible, and minimizes influence of a decrease in the resolution caused by the diffraction.

The control for the possible ghosts is not limited to a case where a special imaging mode is set, may be applied to a general operation mode, and can provide an image with a higher quality compared with that according to prior art in this general operation mode.

Figure 4:
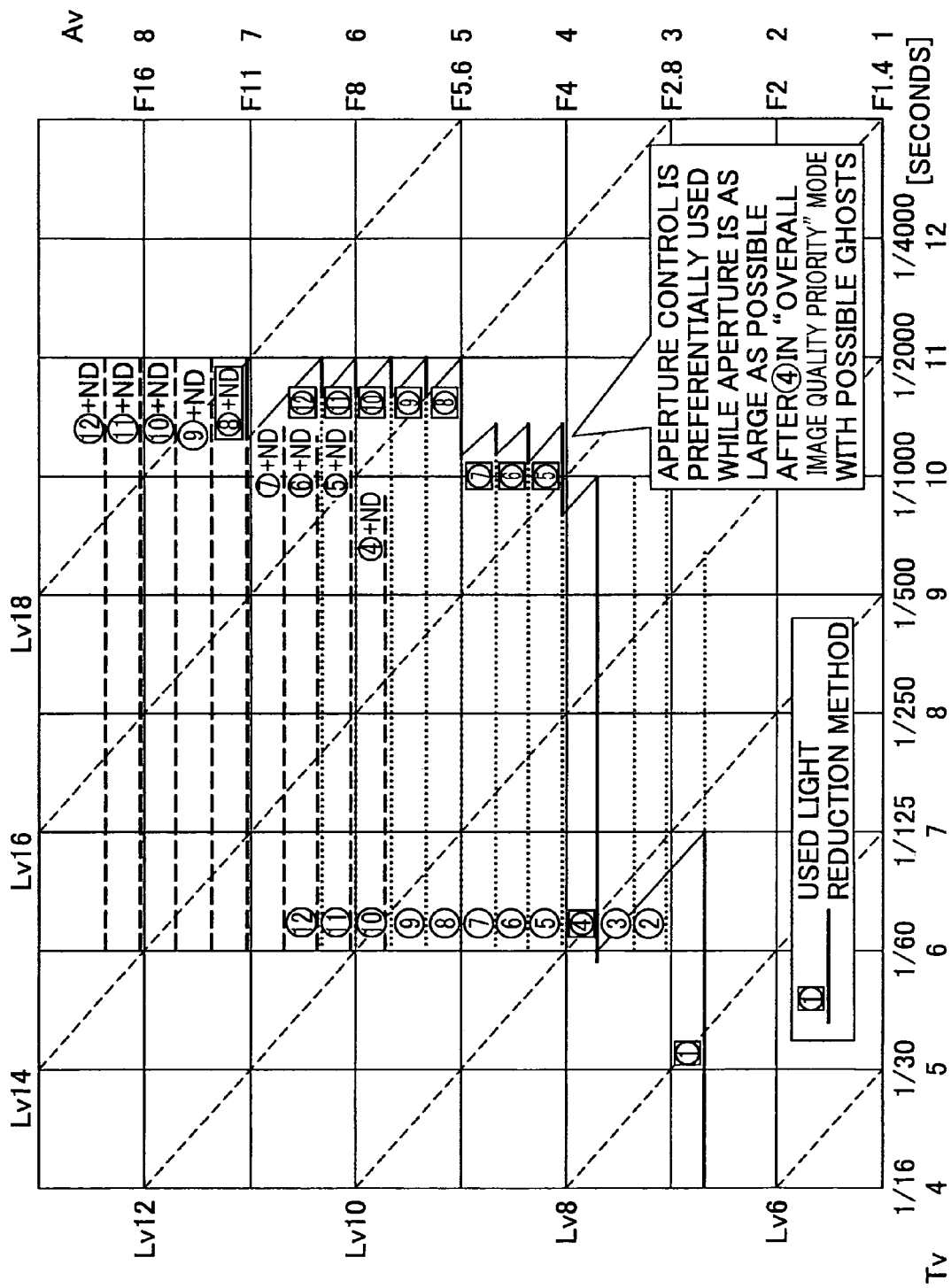
FIG. 4 is an exposure chart showing an exposure control characteristic in a possible ghost state in the overall image quality priority mode of the digital camera according to the first embodiment of the present invention.

Though an embodiment optimal for acquiring a high quality image is the overall image quality priority mode according to the exposure charts in FIGS. 3 and 4, the power consumption listed as the last entry in FIG. 12 is also required as an important factor. In other words, though, in consideration of only the image quality, the overall image quality priority mode according to the first embodiment whose exposure charts are shown in FIGS. 3 and 4 is the most desirable, an automatic mode, which is a fully automatic imaging mode, and does not require special operations of a user on an image input device such as a camera, preferably considers the power consumption, and thus is a control program with a small power consumption. The automatic mode filling these demands is a second embodiment of the present invention, and an exposure chart of control in the normal state where an extremely high luminance portion such as the sun, which causes ghosts, is not present on the image plane of the object image, and an exposure chart of control in the possible ghosts state where an extremely high luminance portion such as the sun, which causes ghosts, is present on the image plane of the object image are respectively shown in FIGS. 5 and 6.

Figure 5:
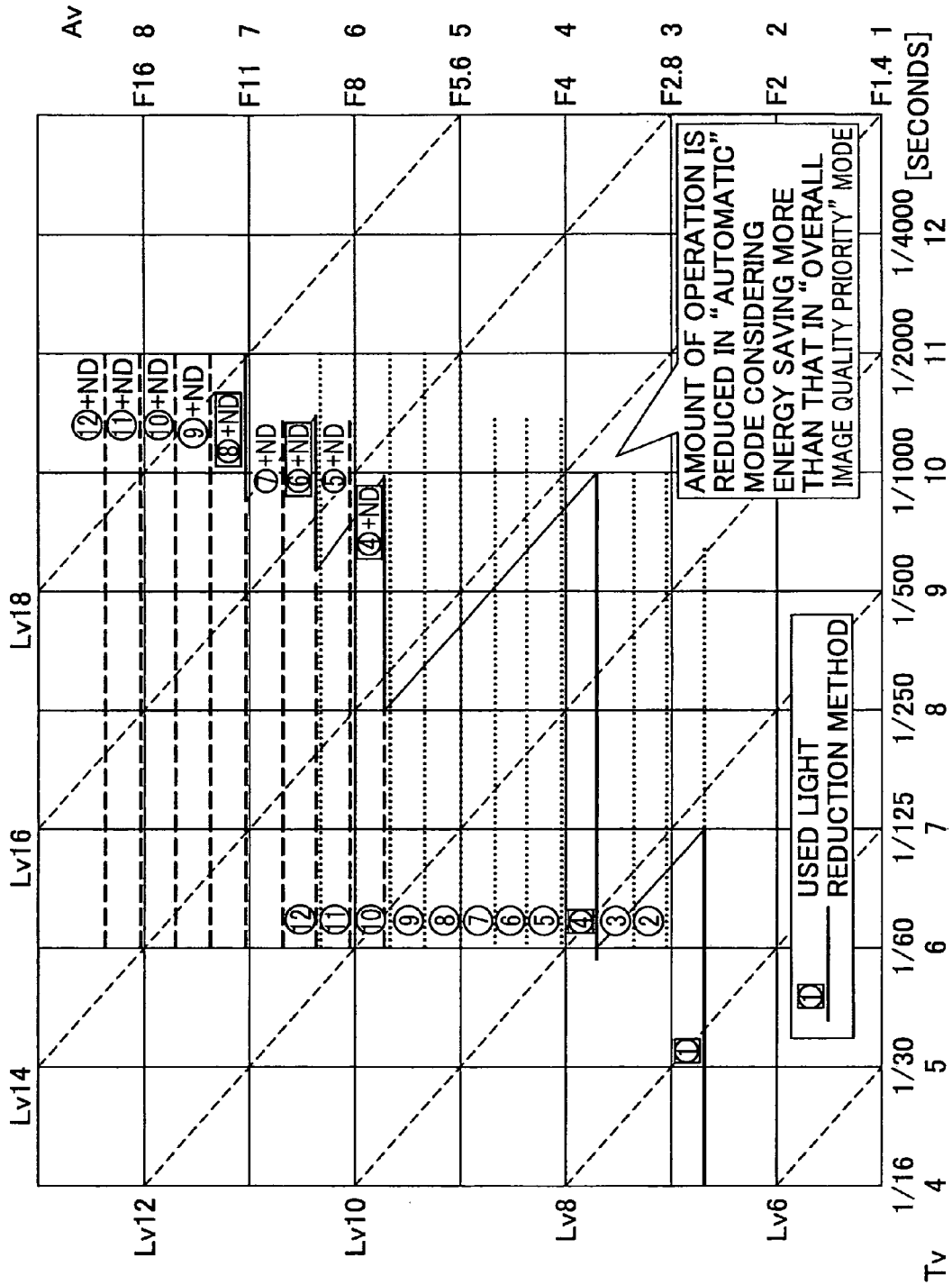
FIG. 5 is an exposure chart showing an exposure control characteristic in a normal state in an automatic mode of the digital camera according to a second embodiment of the present invention.

First, a description will be given of control for a normal object in the automatic mode, which is the second embodiment of the image input device according to the present invention, namely normal control in the automatic mode, with reference to the exposure chart shown in FIG. 5. The control in the normal state whose exposure chart is shown in FIG. 5 carries out setting to acquire a proper image quality while considering the power consumption. Also in the exposure chart shown in FIG. 5, the horizontal axis represents the shutter speed and a TV corresponding thereto, and the vertical axis represents the aperture value by the first light reduction means, and an AV corresponding thereto. Circled numbers represent respective stages of the aperture adjustment for the adjustment of the quantity of light, and the light quantity can be adjusted in a ⅓-AV or ⅓-LV increment. Bold lines parallel with the horizontal axis indicate a program of a used light reduction.

The exposure control is carried out from a state with a small LV to a state with a large LV, which correspond to object luminance, in the exposure chart in FIG. 5 in the following manner.

Circled "1" corresponding to the smallest LV represents the full aperture state of the multistage aperture 13 (corresponding to F2.5), and the exposure quantity is controlled by switching the shutter speed in a range from 1/16 seconds to 1/125 seconds stepwise according to the object luminance for this aperture. A state where the aperture is the full aperture represented by the circled "1", and the shutter speed is 1/125 seconds transitions to a state where the same LV is provided by a shutter speed (1/60 seconds) while the multistage aperture 13 is closed from the full aperture by 1 AV, which is represented by circled "4". Circled "4" represents the state where the multistage aperture 13 is closed by 1 AV, and the exposure quantity is controlled by switching the shutter speed stepwise in a range from 1/60 seconds to 1/1000 seconds according to the object luminance in this aperture state.

Then, a state where the multistage aperture 13 is closed by 1 stage (1 AV) from the full aperture, which is represented by circled "4", and the shutter speed is 1/1000 seconds transitions to a state where the same LV is provided by a shutter speed (1/250 seconds) while the multistage aperture 13 is closed by 1 stage (1 AV) from the full aperture to a state represented by circled "4" and the ND filter 15 as the second light reduction means is added. While the multistage aperture 13 is closed by 1 stage (circled "4"), and the ND filter 15 is simultaneously used, the exposure quantity is controlled by switching the shutter speed stepwise in a range from 1/250 seconds to 1/1000 seconds according to the object luminance. Further, a state where the state of the multistage aperture 13 is circled "4", the ND filter 15 is simultaneously used, and the shutter speed is 1/1000 seconds transitions to a state where the same LV is provided by a shutter speed (approximately 1/600 seconds) while the multistage aperture 13 is further closed by 2 stages (⅔ AV), which is represented by circled "6", and the ND filter 15 is simultaneously used. While the state of the multistage aperture 13 is circled "6", and the ND filter 15 is simultaneously used, the exposure quantity is controlled by switching the shutter speed stepwise in a range from approximately 1/600 seconds to approximately 1/1100 seconds according to the object luminance. A state where the state of the multistage aperture 13 is circled "6", the ND filter 15 is simultaneously used, and the shutter speed is approximately 1/1100 seconds transitions to a state where the same LV is provided by a shutter speed (approximately 1/800 seconds) while the multistage aperture 13 is further closed by 2 stages (⅔ AV), which is represented by circled "8", and the ND filter 15 is simultaneously used. While the state of the multistage aperture 13 is circled "8", and the ND filter 15 is simultaneously used, the exposure quantity is controlled by switching the shutter speed stepwise in a range from approximately 1/800 seconds to 1/2000 seconds according to the object luminance.

In this way, in the automatic mode for a normal object, the state of circled "4" represents the aperture of the multistage aperture 13 closed by 1 stage (1 AV) from the full aperture as in FIG. 3, in FIG. 5, and the state where the aperture reduced by one stage along with the ND filter 15 is given priority, and the mechanical drive is reduced as much as possible in the area requiring further light reduction. While the aperture closed by 1.33 stages (1.33 AV) from the full aperture indicated by circled "5"+ND filter, the aperture closed by 1.66 stages (1.66 AV) indicated by circled "6"+ND filter, and the aperture closed by 2 stages (2 AV) indicated by circled "7"+ND filter are used in FIG. 3, the whole these areas are handled by the aperture closed by 2 stages from the full aperture indicated by circled "7"+ND filter in FIG. 5. With reference to FIG. 11, though the MTF gradually decreases for the aperture closed by 1.33 stages (=AV4+ND filter) from the full aperture indicated by circled "5"+ND filter, the aperture closed by 1.66 stages (=AV4.3++ND filter) from the full aperture indicated by circled "6"++ND filter, and the aperture closed by 2 stages (=AV4.6++ND filter) from the full aperture indicated by circled "7"+ND filter, the MTF does not extremely decreases. Therefore, in such a case where the light reduction can be carried out by the aperture closed by 2 stages from the full aperture++ND filter, the multistage aperture with ND filter handles a range corresponding to several stages as shown in FIG. 5. In this way, it is possible to set the light quantity adjustment mode in which the operation of the mechanism of the multistage aperture is reduces as much as possible, thereby reducing the power consumption.

Figure 6:
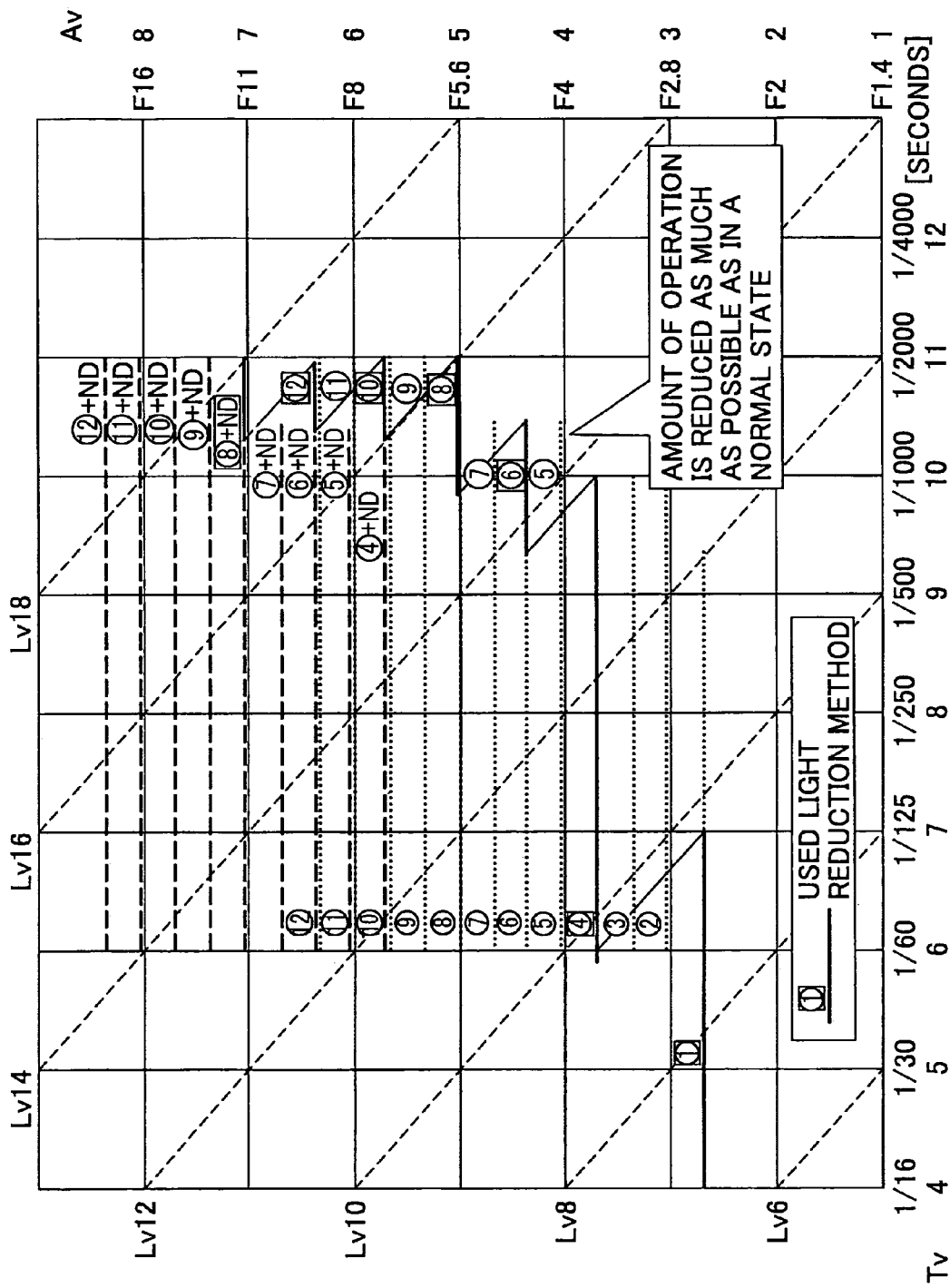
FIG. 6 is an exposure chart showing an exposure control characteristic in a possible ghost state in the automatic mode of the digital camera according to the second embodiment of the present invention.

With reference to an exposure chart shown in FIG. 6, a description will now be given of the automatic mode with possible ghosts where, for example, the object determining means recognizes by detecting and discriminating the luminance distribution on the image plane of the object image that a high luminance object such as the sun is present on the image plane in the automatic mode, which is the second embodiment of the image input device according to the present invention, namely ghosts possibly occur. The exposure control in the automatic mode with possible ghosts is different from the control operation in the normal state shown in FIG. 5, and prevents ghosts from generating as much as possible in consideration of the power consumption, and minimizes influence of a decrease in the resolution caused by the diffraction.

In other words, the exposure control is carried out from a state with a small LV to a state with a large LV, which correspond to object luminance, in the exposure chart in FIG. 6 in the following manner.

Circled "1" corresponding to the smallest LV represents the full aperture state of the multistage aperture 13 (corresponding to F2.5), and the exposure quantity is controlled by switching the shutter speed in a range from 1/16 seconds to 1/125 seconds stepwise according to the object luminance for this aperture. A state where the aperture is the full aperture represented by the circled "1", and the shutter speed is 1/125 seconds transitions to a state where the same LV is provided by a shutter speed (1/60 seconds) while the multistage aperture 13 is closed from the full aperture by 1 AV, which is represented by circled "4". Circled "4" represents the state where the multistage aperture 13 is closed by 1 AV, and the exposure quantity is controlled by switching the shutter speed stepwise in a range from 1/60 seconds to 1/1000 seconds according to the object luminance in this aperture state.

Then, a state where the state of the multistage aperture 13 is circled "4", and the shutter speed is 1/1000 seconds transitions to a state where the same LV is provided by a shutter speed (approximately 1/600 seconds) while the multistage aperture 13 is further closed by 2 stages (2/3 AV), which is represented by circled "6". While the state of the multistage aperture 13 is circled "6", the exposure quantity is controlled by switching the shutter speed stepwise in a range from approximately 1/600 seconds to approximately 1/1300 seconds according to the object luminance. Then, a state where the state of the multistage aperture 13 is circled "6", and the shutter speed is approximately 1/1300 seconds transitions to a state where the same LV is provided by a shutter speed (approximately 1/900 seconds) while the multistage aperture 13 is further closed by 2 stages (2/3 AV), which is represented by circled "8", and corresponds to F5.6 (AV5). While the state of the multistage aperture 13 is circled "8", the exposure quantity is controlled by switching the shutter speed stepwise in a range from approximately 1/900 seconds to 1/2000 seconds according to the object luminance.

Then, a state where the state of the multistage aperture 13 is circled "8", and the shutter speed is 1/2000 seconds transitions to a state where the same LV is provided by a shutter speed (approximately 1/1300 seconds) while the multistage aperture 13 is further closed by 2 stages (2/3 AV), which is represented by circled "10". While the state of the multistage aperture 13 is circled "10", the exposure quantity is controlled by switching the shutter speed stepwise in a range from approximately 1/1300 seconds to 1/2000 seconds according to the object luminance. Then, a state where the state of the multistage aperture 13 is circled "10", and the shutter speed is 1/2000 seconds transitions to a state where the same LV is provided by a shutter speed (approximately 1/1300 seconds) while the multistage aperture 13 is further closed by 2 stages (2/3 AV), which is represented by circled "12". While the state of the multistage aperture 13 is circled "12", the exposure quantity is controlled by switching the shutter speed stepwise in a range from approximately 1/1300 seconds to 1/2000 seconds according to the object luminance. Then, a state where the state of the multistage aperture 13 is circled "12", and the shutter speed is 1/2000 seconds transitions to a state where the same LV is provided by a shutter speed (approximately 1/1200 seconds) while the multistage aperture 13 is set to a state which is represented by circled "8", and corresponds to F5.6, and the ND filter 15 is simultaneously used. While the state of the multistage aperture 13 is circled "8", and the ND filter 15 is simultaneously used, the exposure quantity is controlled by switching the shutter speed stepwise in a range from approximately 1/1200 seconds to 1/2000 seconds according to the object luminance.

In this way, in the possible ghost state in the automatic mode where ghosts tend to occur, it is possible to set the light quantity adjustment mode in which the ND filter 15 is used as less as possible, which is different from the normal state, the aperture is set to large as possible in order to minimize the influence of the decrease of the resolution due to the diffraction at a small aperture, and the mechanical operations of the multistage aperture and the ND filter are minimized considering saving the electric power, resulting in a reduction of the power consumption.

In the automatic mode according to the above embodiment, though the operation is approximately the same as that of the overall image quality priority mode, since the electric power saving is considered in the automatic mode, the operations of the ND filer and the aperture are minimized.

Both the above embodiments are configured under the conditions that the full aperture value (F value) of the multistage aperture 13 is F2.5, the multistage aperture can set the aperture to 12 stages including the full aperture in a 1/3-AV increment, and the ND filter reduces the transmitting light quantity by two stages (2 EV). However, the full aperture of the multistage aperture, and the increment for the aperture adjustment, the number of the stages of the aperture adjustment, and the light reduction quantity of the ND filter are not limited to specific numerical values, and can be set as desired.

Figure 7A:
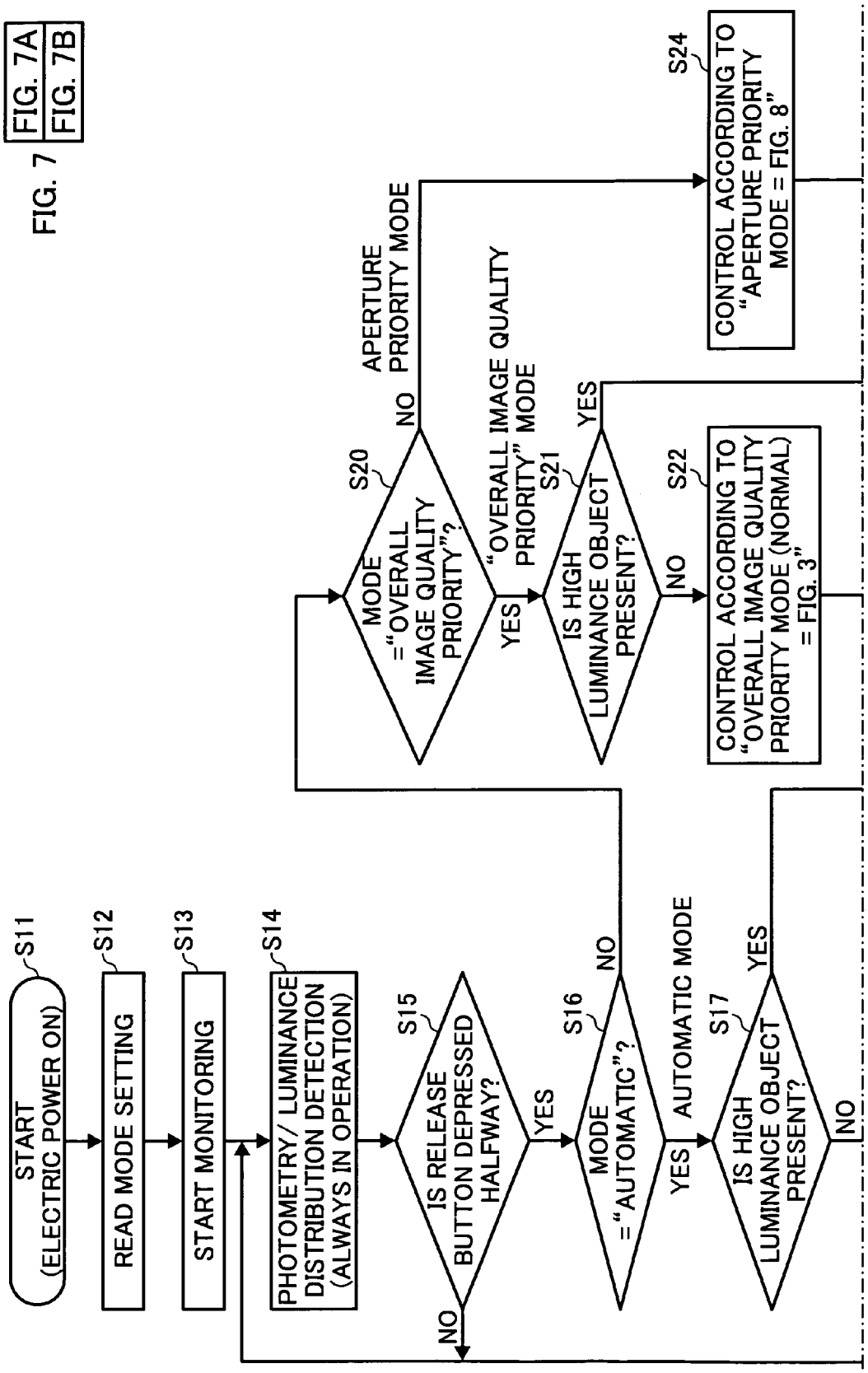
FIG. 7 is a flowchart showing an exposure control operation of an exposure control system of the digital camera according to a third embodiment of the present invention.

Further, FIG. 7 shows a flowchart describing control of aperture control system employed for a digital camera as a third embodiment of the image input device according to the present invention, which properly selects according to settings, and cause to selectively operate according to conditions in the overall image quality priority mode in the normal state and in the possible ghost state, the automatic mode in the normal state and in the possible ghost state described in the first and the second embodiments mentioned above, and an aperture priority mode which is conventionally used.

The flowchart in FIG. 7 extracts and schematically shows only portions relating to the present invention, actual focusing is more complicated than illustrated operations, and FIG. 7 does not shows operations such as an operation for automatically setting the white balance. It should be noted that the hardware configuration of the digital camera refers to FIG. 1.

First, if the operation unit 24 or the like is operated, a power supply is turned on (step S11), the control system starts the operation, and starts monitoring of an electronic finder type which causes the mode setting unit 25 to check the set mode (step S12), and acquires an object image formed by the optical means 10 through the solid-state imaging element 16, the imaging processing unit 17, the A/D conversion unit 18, and the signal processing unit 19, and shows the object image on the monitor 29 through the monitor driver 28 approximately in real time (step S13). In order to reduce the time lug, a photometry operation is carried out during this monitoring (step S14). The object luminance distribution information is acquired during the photometry operation in this step S14 in this system.

The control system determines whether a release button is depressed halfway on the operation unit 24 (step S15), the control system returns to the step S14 if the release button is not depressed halfway, and waits until the release button is depressed halfway while repeating the photometry and the detection of the luminance distribution. If the release button is depressed halfway in the step S15, the control system determines whether the mode read in the step S12 is the automatic mode (step S16), determines whether the mode is the overall image quality priority mode if the mode is not the automatic mode (step S20), and considers the mode as the aperture priority mode if the mode is not the overall image quality priority mode.

If the control system determines that the mode is the automatic mode in the step S16, the control system determines whether a high luminance object such as the sun is present on the image plane based on the luminance distribution detected in the immediately preceding step S14 (step S17), and the control system carries out the exposure control by setting the aperture and the shutter speed according to the exposure chart in the normal state in the automatic mode shown in FIG. 5 if the control system determines that a high luminance object is not present (step S18). If the control system determines that a high luminance object is present in the step S17, the control system carries out the exposure control by setting the aperture and the shutter speed according to the exposure chart in the possible ghost state in the automatic mode shown in FIG. 6 (step S19).

If the control system determines that the mode is not the automatic mode in the step S16, and determines that the mode is the overall image quality priority mode in the step S20, the control system determines whether a high luminance object such as the sun is present on the image plane based on the luminance distribution detected in the immediately preceding step S14 (step S21), and the control system carries out the exposure control by setting the aperture and the shutter speed according to the exposure chart in the normal state in the overall image quality priority mode shown in FIG. 3 if the control system determines that a high luminance object is not present (step S22). If the control system determines that a high luminance object is present in the step S21, the control system carries out the exposure control by setting the aperture and the shutter speed according to the exposure chart in the possible ghost state in the overall image quality priority mode shown in FIG. 4 (step S23).

If the control system determines that the mode is not the automatic mode in the step S16, determines that the mode is not the overall image quality priority mode in the step S20, and determines that the mode is the aperture priority mode, the control system carries out the exposure control by setting the aperture and the shutter speed according to an exposure chart in the aperture priority mode (refer to FIG. 8) (step S24).

If the control system carries out the exposure control either in the step S18, step S19, step S22, step S23, or step S24, the system controller 21 drives at least a part of the lens groups 11 and 12 of the optical means 10 via the motor driver 30 and the lens motor 31, thereby carrying out the focusing operation (step S25), and the control system determines whether the release button is being depressed halfway (step S26). If the release button is not being depressed halfway in the step S26, the control system returns to the step S14, and repeats the operation following the photometry and the luminance distribution detection. If the release button is being depressed halfway in the step S26, the control system determines whether the release button is fully depressed (step S27), and if the release button is not fully depressed, the control system returns to the step S26, and determines whether the release button is being depressed halfway. If the control system detects that the release button is fully depressed in the step S27, the control system carries out an imaging operation such as acquiring and storing image data (step S28), and returns to the step S14.

Figure 8:
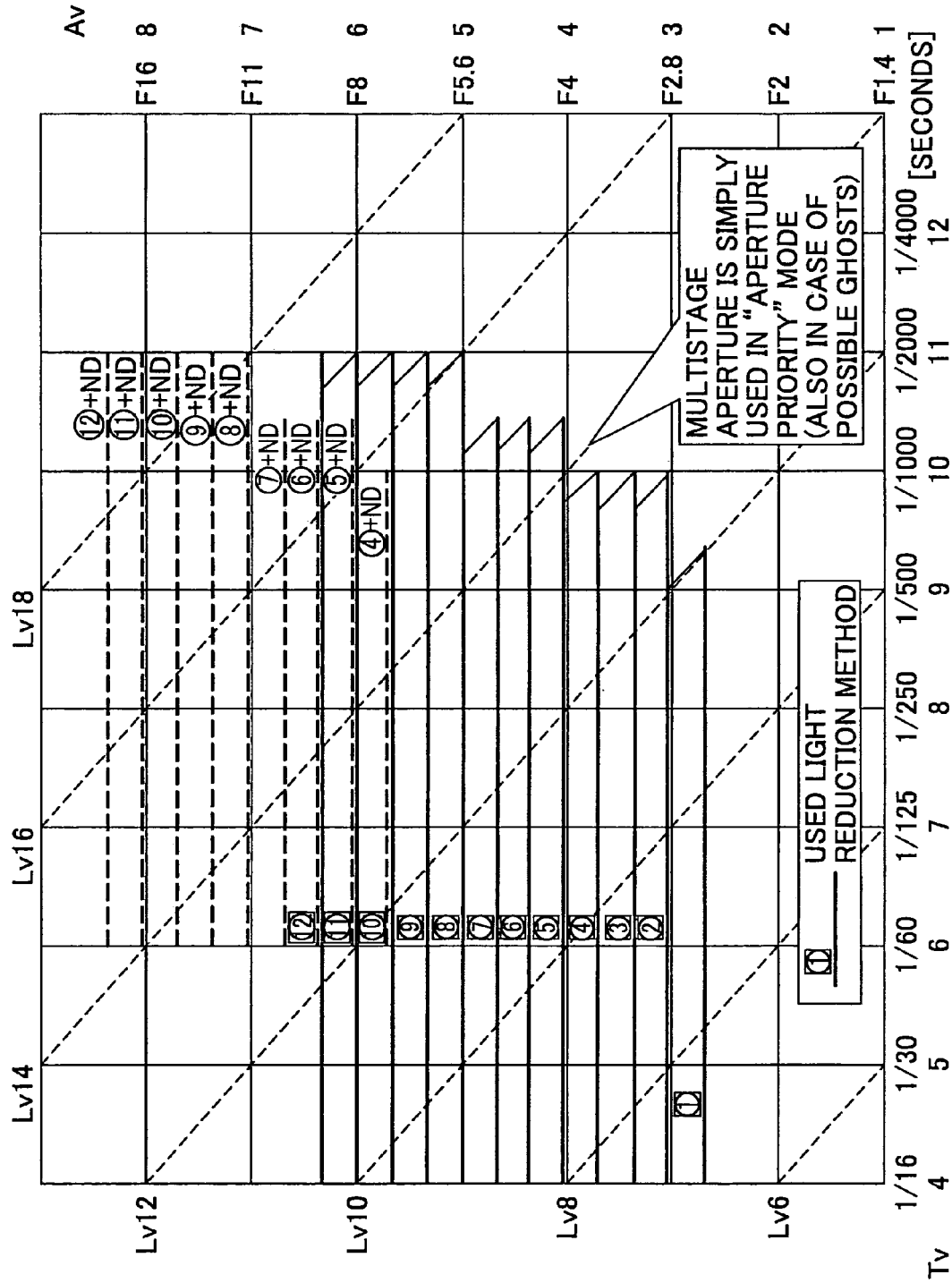
FIG. 8 is an exposure chart showing an exposure control characteristic in an exposure priority mode used for the exposure control of the digital camera according to the third embodiment of the present invention.
Figure 10:
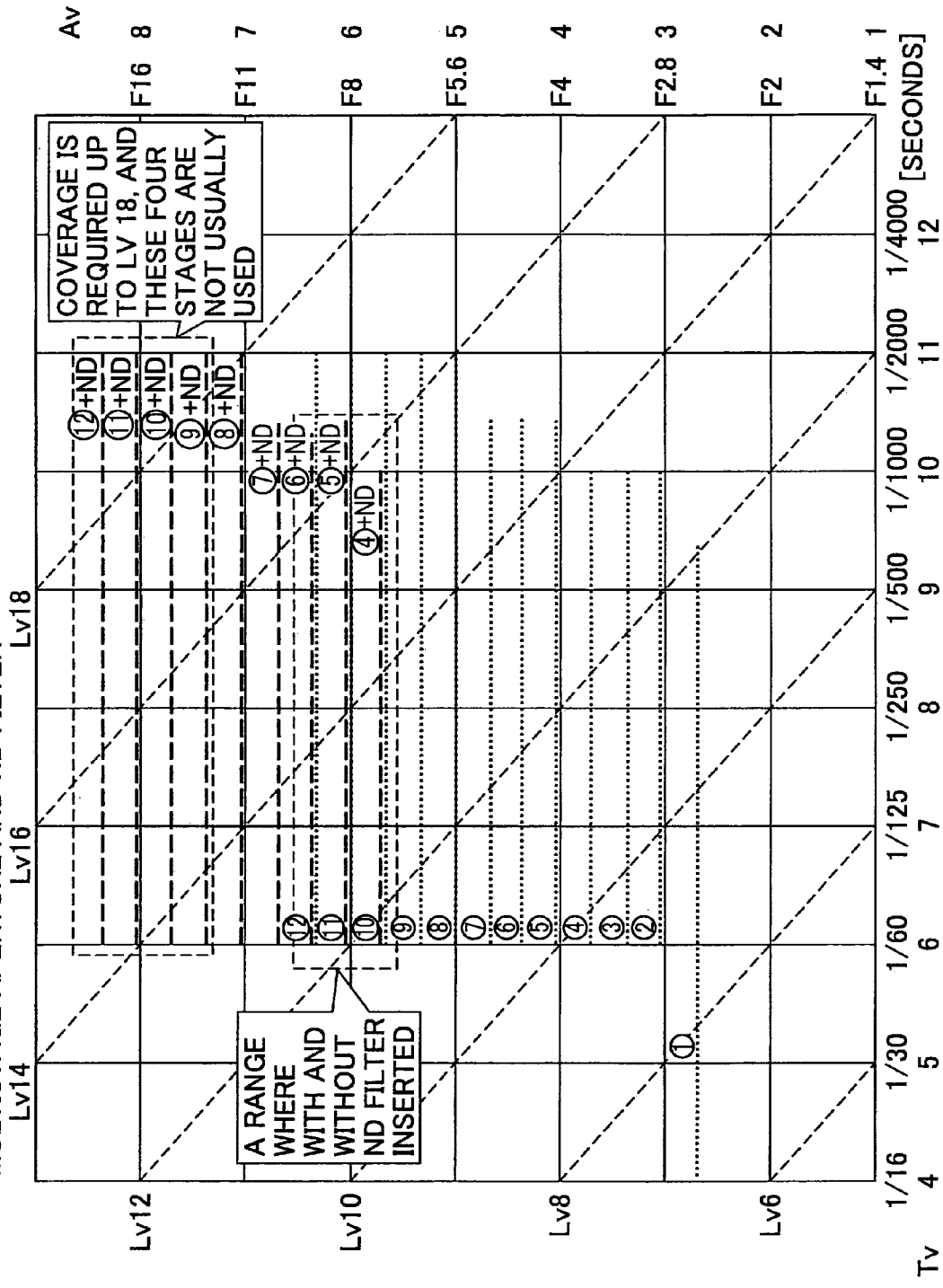
FIG. 10 is an exposure chart showing the example of simultaneous use of the multistage aperture and the ND filter used for the exposure control of the digital camera according to the embodiments of the present invention.
Figure 13:
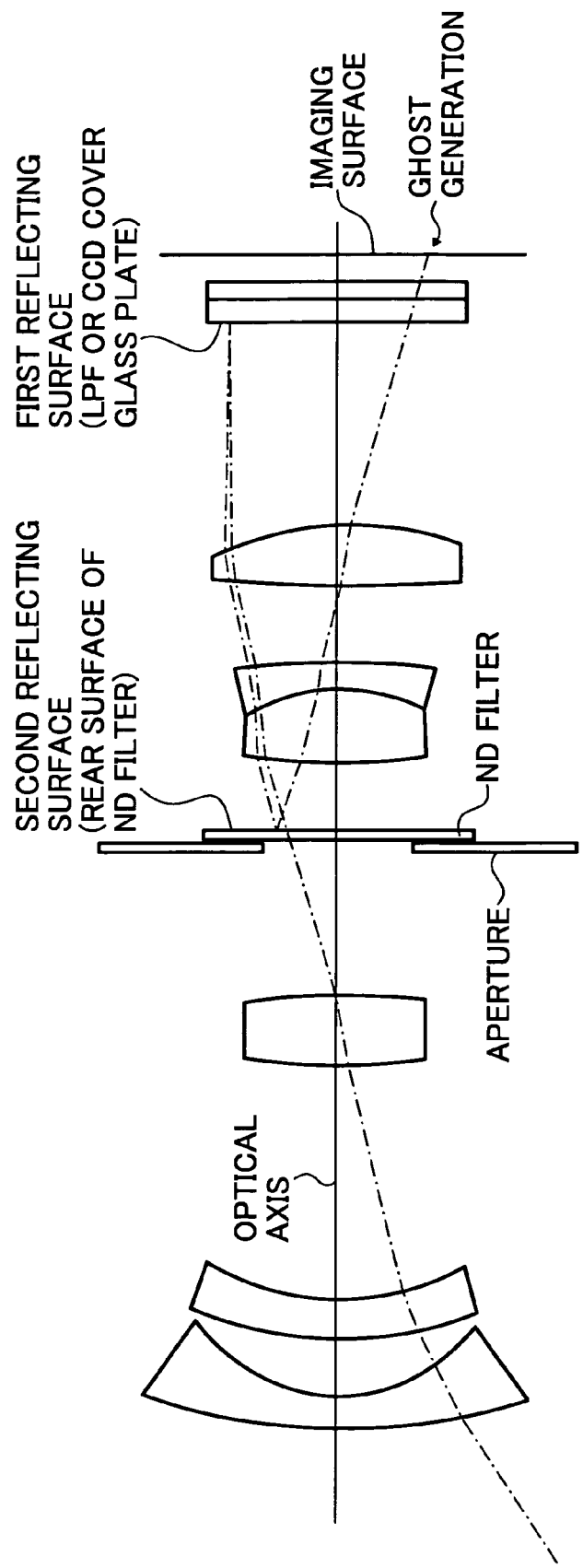
FIG. 13 is a schematic diagram describing a principle of generation of ghosts due to insertion of an ND filter into an optical system of an image input device such as a digital camera.

A description will now be given of the aperture priority mode in the step S24 with reference to the exposure chart for the conventionally-used aperture priority mode shown in FIG. 8. This aperture priority mode is used for a case where the depth of field in FIG. 12 is focused, and a user selects an aperture, and the exposure is adjusted according to the selected aperture. In this case, the ND filter 15 is not used, and the multistage aperture 13 is set according to the selected aperture, and the shutter speed is adjusted so as to provide an exposure according to the object luminance. If the exposure according to the object luminance cannot be reached at the highest shutter speed for the selected aperture, the multistage aperture is gradually closed. It should be noted that the highest shutter speed for circled "1" is approximately $1/700$ seconds, the highest shutter speed for circled "2" to circled "4" is $1/1000$ seconds, the highest shutter speed for circled "5" to circled "7" is approximately $1/1200$ seconds, and the highest shutter speed for circled "8" to circled "12" is $1/2000$ seconds, in FIG. 8.

The present invention is not limited to the embodiments described above and illustrated in the drawings, and may be modified and embodied in various ways within a scope without departing from the gist thereof. For example, as the first light reduction means is not limited to the multistage aperture, and any aperture mechanism may be used. Moreover, the second light reduction means is not limited to the ND filter, may be selected from various optical filters and optical elements, which can restrain the transmission of light as long as they do not adversely affect the acquired image, and may be a filter which changes the transmitting light quantity by overlapping polarizing filters, and changing mutual polarizing directions, thereby changing the transmitting light quantity, a filter such as a liquid crystal which has a variable transmittance, and a half-mirror which is disposed so as to reflect a part of the incident light and to pass remaining thereof.

What is claimed is:

1. An image input device comprising:
   an imaging device which is configured to convert an object image into electrical signals;
   a photographing optical unit which is configured to form the object image on the imaging device;
   an aperture unit which is configured to adjust a quantity of passing light by changing a size of an opening of the aperture unit over a plurality of stages;

a filter unit which is configured to change transmittance of light and adjust a quantity of passing light by insertion or retraction of the filter unit with respect to an optical axis of the photographing optical unit;

a shutter unit which is configured to adjust an exposure amount of the imaging device by changing exposure time;

a control unit which is configured to control the aperture unit, the filter unit and the shutter unit according to object luminance; and an object determining unit which is configured to detect luminance distribution on an image plane of the object image and determine whether a high luminance object is present on the image plane of the object image, wherein when the object determining unit judges that a high luminance object is not present on the image plane of the object image, and when the opening of the aperture unit is adjusted to a first state other than a full aperture state of the aperture unit, and the filter unit is not inserted to the optical axis, the control unit performs a control that inserts the filter unit to the optical axis, and simultaneously changes the size of the opening of the aperture unit from the first state to a second state by at least one-stage of the aperture unit, and wherein when the object determining unit judges that a high luminance object is present on the image plane of the object image, and when the opening of the aperture unit is adjusted to the first state other than the full aperture state of the aperture unit, and the filter unit is not inserted to the optical axis, the control unit performs a control that changes the size of the opening of the aperture unit from the first state to a third state which is nearer the first state than the second state by at least one-stage of the aperture unit according to the object luminance, without inserting the filter unit to the optical axis, and further adjusts the opening of the aperture unit to the second state and inserts the filter unit to the optical axis simultaneously, according to the object luminance.

2. The image input device according to claim 1, wherein said object determining unit includes a unit that determines that a high luminance object is present on the image plane of the object image if a luminance portion exceeding a predetermined luminance is present on the image plane of the object image.

3. The image input device according to claim 1, wherein said object determining unit includes a unit that determines that a high luminance object is present on the image plane of the object image if a ratio of a luminance of a portion on the image plane of the object image exceeding a predetermined luminance to an average luminance of the image plane exceeds a predetermined value.

* * * * *